United States Patent
Zhou et al.

(10) Patent No.: US 12,150,018 B2
(45) Date of Patent: Nov. 19, 2024

(54) DATA TRANSMISSION METHOD, APPARATUS, AND SYSTEM

(71) Applicant: Huawei Technologies Co., Ltd., Shenzhen (CN)

(72) Inventors: Yifan Zhou, Shenzhen (CN); Yuchen Guo, Shenzhen (CN); Peter Loc, Cupertino, CA (US)

(73) Assignee: Huawei Technologies Co., Ltd., Shenzhen (CN)

(*) Notice: Subject to any disclaimer, the term of this patent is extended or adjusted under 35 U.S.C. 154(b) by 369 days.

(21) Appl. No.: 17/648,048

(22) Filed: Jan. 14, 2022

(65) Prior Publication Data

US 2022/0141629 A1    May 5, 2022

Related U.S. Application Data

(63) Continuation of application No. PCT/CN2020/094010, filed on Jun. 2, 2020.

(30) Foreign Application Priority Data

Jul. 16, 2019   (CN) .................. 201910640122.X

(51) Int. Cl.
   *H04W 4/20*      (2018.01)
   *H04L 1/1607*    (2023.01)
   *H04W 28/02*     (2009.01)
   *H04W 74/06*     (2009.01)

(52) U.S. Cl.
   CPC .............. *H04W 4/20* (2013.01); *H04L 1/1614* (2013.01); *H04W 28/0268* (2013.01); *H04W 28/0278* (2013.01); *H04W 74/06* (2013.01)

(58) Field of Classification Search
None
See application file for complete search history.

(56) References Cited

U.S. PATENT DOCUMENTS

| | | | |
|---|---|---|---|
| 8,891,497 B1 * | 11/2014 | Vleugels | H04W 52/0274 370/464 |
| 2004/0203658 A1 | 10/2004 | Narayanan | |
| 2004/0203825 A1 | 10/2004 | Daniel et al. | |

(Continued)

FOREIGN PATENT DOCUMENTS

| | | |
|---|---|---|
| CN | 1997227 A | 7/2007 |
| CN | 101175039 A | 5/2008 |

(Continued)

OTHER PUBLICATIONS

Liu, Guangming, "Discussion on wireless optimization strategy based on user perception", with English Abstract, Communication Design and Application, Feb. 2018, 3 pages.

(Continued)

*Primary Examiner* — Andre Tacdiran
(74) *Attorney, Agent, or Firm* — Slater Matsil, LLP

(57) ABSTRACT

A method includes: when data of a first service needs to be sent to a receive end, sending m indication frames to the receive end if a type of the first service is a target service type; receiving n trigger frames sent by the receive end based on the m indication frames; and each time one trigger frame is received, sending the data of the first service to the receive end by using a transmission resource indicated by the trigger frame.

20 Claims, 11 Drawing Sheets

(56) References Cited

U.S. PATENT DOCUMENTS

| | | | |
|---|---|---|---|
| 2007/0230418 A1* | 10/2007 | Takeuchi | H04W 52/0225 370/412 |
| 2009/0196211 A1* | 8/2009 | Wentink | H04W 52/0206 370/311 |
| 2014/0295865 A1 | 10/2014 | Fantaye et al. | |
| 2015/0295797 A1* | 10/2015 | Kneckt | H04L 43/062 370/252 |
| 2016/0227533 A1* | 8/2016 | Josiam | H04W 74/006 |
| 2016/0345266 A1* | 11/2016 | Park | H04W 52/0235 |
| 2018/0206221 A1* | 7/2018 | Chen | H04L 1/0075 |
| 2020/0193391 A1* | 6/2020 | Aspromonte | G06Q 10/1097 |
| 2021/0329547 A1* | 10/2021 | Kim | H04W 52/0229 |

FOREIGN PATENT DOCUMENTS

| | | |
|---|---|---|
| CN | 102781102 A | 11/2012 |
| CN | 102791031 A | 11/2012 |
| CN | 104039016 A | 9/2014 |
| CN | 107872885 A | 4/2018 |
| CN | 108307505 A | 7/2018 |
| CN | 108347326 A | 7/2018 |
| CN | 108811099 A | 11/2018 |
| CN | 109076588 A | 12/2018 |
| WO | 2017133352 A1 | 8/2017 |
| WO | WO2018028394 * | 2/2018 |
| WO | 2018191549 A1 | 10/2018 |

OTHER PUBLICATIONS

"IEEE Draft Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications Amendment Enhancements for High Efficiency WLAN," in IEEE P802.11ax/D4.0, Feb. 2019, pp. 1-746, Mar. 12, 2019.

IEEE Std 802.11-2016 (Revision of IEEE Std 802.11-2012), Part 11: Wireless LAN Medium Access Control (MAC) and Physical Layer (PHY) Specifications, IEEE Computer Society, Sponsored by the LAN/MAN Standards Committee, Nov. 2016, 3534 pages.

IEEE P802.11-REVmd /D2.0, Dec. 2018, IEEE P802.11-REVmdTM/ D2.0, Dec. 2018 Draft Standard for Information technology, Telecommunications and information exchange between systems Local and metropolitan area networks, Specific requirements, Part 11: Wireless LAN Medium Access Control (MAC) and Physical Layer (PHY) Specifications, Prepared by the 802.11 Working Group of the LAN/MAN Standards Committee of the IEEE Computer Society, 4601 pages.

Nokia Siemens Networks, "Link quality reporting for the two most relevant modulation schemes", 3GPP TSG Geran #41, GP-090347, Feb. 16-20, 2009, St Julians, Malta, 12 pages.

Motorola Mobility et al., "PDU Session establishment for Trusted Non-3GPP Access", SA WG2 Meeting #131, S2-1901530, Santa Cruz, Tenerife, Spain, Feb. 25-Mar. 1, 2019, 3 pages.

* cited by examiner

| ACI bitmap field | Traffic identifier difference field | Scaling factor field | Data volume indication field | Trigger interval field | Duration indication field |
|---|---|---|---|---|---|

FIG. 3

| ACI bitmap field | Traffic identifier difference field | Access category index high field | Scaling factor field | Queue size high field | Queue size all field |
|---|---|---|---|---|---|

FIG. 4

| Element identifier field | Length field | TS information field | Service type indication field | Data volume indication field | Trigger interval field | Start time field | End time field |
|---|---|---|---|---|---|---|---|

FIG. 5

| Element identifier field | Length field | TS information field | Another field |
|---|---|---|---|

FIG. 6

| TWT request field | TWT setup command field | Trigger field | Implicit field | Flow type field | TWT flow identifier field | TWT wake interval exponent field | TWT protection field | TSA indication Field |

FIG. 7

| TWT request field | TWT setup command field | Trigger field | Implicit field | Flow type field | TWT flow identifier field | TWT wake interval exponent field | TWT protection field |

DATA TRANSMISSION METHOD, APPARATUS, AND SYSTEM

CROSS-REFERENCE TO RELATED APPLICATIONS

This application is a continuation of International Application No. PCT/CN2020/094010, filed on Jun. 2, 2020, which claims priority to Chinese Patent Application No. 201910640122.X, filed on Jul. 16, 2019. The disclosures of the aforementioned applications are hereby incorporated by reference in their entireties.

TECHNICAL FIELD

This application relates to the field of communication technologies, and in particular, to a data transmission method, apparatus, and system.

BACKGROUND

With development of communication technologies, a wireless local area network (WLAN) technology is widely used. Service data may be transmitted, by using a transmission resource, between a transmit end and a receive end that use the WLAN technology.

In a related technology, when the transmit end needs to send service data to the receive end, the transmit end may first contend with another apparatus for a transmission resource, and then send the service data to the receive end on the transmission resource obtained through contention.

However, when the transmit end needs to send the service data to the receive end, the transmit end may fail to obtain a transmission resource through contention. Consequently, the service data cannot be rapidly transmitted to the receive end, and a transmission delay of the service data occurs. This affects a normal operation of a service, and especially affects a normal operation of a delay-sensitive service that requires a low delay.

SUMMARY

This application provides a data transmission method, apparatus, and system, to resolve a problem that a transmit end may fail to obtain a transmission resource through contention when the transmit end needs to send service data to a receive end. The technical solutions are as follows:

According to a first aspect, a data transmission method is provided, and is applied to a transmit end. The method includes: when data of a first service needs to be sent to a receive end, sending m indication frames to the receive end if a type of the first service is a target service type; receiving n trigger frames sent by the receive end based on the m indication frames; and each time one trigger frame is received, sending the data of the first service to the receive end by using a transmission resource indicated by the trigger frame. $m \geq 1$, and the m indication frames are used to indicate the target service type and a target time interval, where $n \geq 1$, the trigger frame is used to indicate a transmission resource allocated to the transmit end, and the transmission resource is used to transmit data of a service of the target service type; and when $n > 1$, a time interval at which the receive end sends the trigger frame every two adjacent times is less than or equal to the target time interval.

If the type of the first service is the target service type, before sending the data of the first service to the receive end, the transmit end may send, to the receive end, the m indication frames used to indicate the target service type. After receiving the m indication frames, the receive end may pre-allocate, based on the m indication frames, the transmission resource to the data that is of the service of the target service type and that is to be transmitted by the transmit end, and indicate the transmission resource by sending the trigger frame to the transmit end. In this way, a data transmission delay caused when the transmit end fails to obtain a transmission resource through contention is avoided. This ensures a normal operation of the service.

Optionally, the m indication frames are further used to indicate a target data volume, the target data volume is a data volume of the data that is of the first service and that is buffered by the transmit end, and a sum of sizes of transmission resources indicated by the n trigger frames is positively correlated with the target data volume.

Optionally, the m indication frames are further used to indicate an identifier of the first service, and the transmission resource is used to transmit the data of the first service. To be specific, the transmission resource allocated by the receive end to the transmit end is used to transmit data of a specific service (the first service). When the transmit end has to-be-transmitted data of a plurality of services, and types of the plurality of services each are the target service type, the receive end can allocate, to the transmit end, a transmission resource used to transmit data of each service. In addition, because the transmission resource allocated by the receive end to the transmit end is used to transmit data of only one service, efficiency of transmitting to-be-transmitted data on the transmission resource is high. Certainly, the m indication frames may not be used to indicate the identifier of the first service. This is not limited in this embodiment of this application.

Optionally, the m indication frames include a first indication frame including buffer status report BSR control information, and the BSR control information in the first indication frame is used to indicate the target service type and the target time interval.

Optionally, the BSR control information in the first indication frame includes an access category index ACI bitmap field, a traffic identifier difference field, and a trigger interval field. The ACI bitmap field and the traffic identifier difference field are used to indicate the target service type, and the trigger interval field is used to indicate the target time interval.

Optionally, a value of the ACI bitmap field in the first indication frame is 0, 1, or 2. When the value of the ACI bitmap field is 0, a value of the traffic identifier difference field is 0, 1, or 2. When the value of the ACI bitmap field is 1, a value of the traffic identifier difference field is 2 or 3. When the value of the ACI bitmap field is 2, a value of the traffic identifier difference field is 3.

Optionally, the ACI bitmap field and the traffic identifier difference field in the first indication frame are further used to indicate an access category AC of the data of the first service, and an AC of data transmitted by using the transmission resource is the same as the AC indicated by the first indication frame. In this way, it can be ensured that the transmission resource allocated by the receive end to the transmit end is used to transmit data of only one AC. This improves efficiency of transmitting the data of the first service on the transmission resource.

Optionally, the m indication frames are further used to indicate target duration, and duration in which the receive end sends the n trigger frames is greater than or equal to the target duration. It can be learned that the duration in which the receive end sends the n trigger frames is controlled by the transmit end. Certainly, the duration in which the receive end sends the n trigger frames may not be controlled by the transmit end, for example, the duration is default duration at the receive end.

Optionally, the m indication frames include the first indication frame including the BSR control information, and the BSR control information in the first indication frame includes the access category index ACI bitmap field, the traffic identifier difference field, the trigger interval field, a data volume indication field, and a duration indication field. In the BSR control information in the first indication frame, the ACI bitmap field and the traffic identifier difference field are used to indicate the target service type, the trigger interval field is used to indicate the target time interval, the duration indication field is used to indicate the target duration, the data volume indication field is used to indicate the target data volume, the target data volume is the data volume of the data that is of the first service and that is buffered by the transmit end, and the sum of the sizes of the transmission resources indicated by the n trigger frames is positively correlated with the target data volume.

Optionally, in the BSR control information in the first indication frame, the ACI bitmap field, the traffic identifier difference field, the data volume indication field, the trigger interval field, and the duration indication field are sequentially arranged.

Optionally, the trigger interval field and the duration indication field include 10 bits in total.

Optionally, the m indication frames are further used to indicate to start to send the n trigger frames.

Optionally, after the sending m indication frames to the receive end, the method further includes: when there is no need to send the data of the first service to the receive end, sending an end indication frame to the receive end, where the end indication frame is used to indicate the target service type and indicate to stop sending the n trigger frames.

Optionally, the m indication frames include the first indication frame, and both the first indication frame and the end indication frame include BSR control information. The BSR control information in the first indication frame is used to indicate the target service type and the target time interval. The BSR control information in the end indication frame is used to indicate the target service type and indicate to stop sending the trigger frame.

Optionally, the BSR control information in the first indication frame includes the ACI bitmap field, the traffic identifier difference field, the trigger interval field, and a start trigger field. In the BSR control information in the first indication frame, the ACI bitmap field and the traffic identifier difference field are used to indicate the target service type, the trigger interval field is used to indicate the target time interval, and the start trigger field is used to indicate the receive end to start to send the n trigger frames. The BSR control information in the end indication frame includes the ACI bitmap field, the traffic identifier difference field, and a stop trigger field. In the BSR control information in the end indication frame, the ACI bitmap field and the traffic identifier difference field are used to indicate the target service type, and the stop trigger field is used to indicate to stop sending the n trigger frames.

Optionally, the BSR control information in the first indication frame further includes a data volume indication field used to indicate the target data volume, the target data volume is the data volume of the data that is of the first service and that is buffered by the transmit end, and the sum of the sizes of the transmission resources indicated by the n trigger frames is positively correlated with the target data volume. In the BSR control information in the first indication frame, the ACI bitmap field, the traffic identifier difference field, the data volume indication field, the trigger interval field, and the start trigger field are sequentially arranged.

Optionally, the trigger interval field and the start trigger field include 10 bits in total, and a quantity of bits of the start trigger field is the same as a quantity of bits of the stop trigger field.

Optionally, the BSR control information in the first indication frame further includes a scaling factor field. In the BSR control information in the first indication frame, the scaling factor field is located between the traffic identifier difference field and the data volume indication field.

Optionally, the m indication frames include the first indication frame used to indicate the target service type and a second indication frame used to indicate the target time interval.

Optionally, the second indication frame is a beacon frame.

Optionally, the sending m indication frames to the receive end includes: sequentially sending the second indication frame and the first indication frame to the receive end.

Optionally, the m indication frames include an indication frame including a quality of service QoS control field, and the QoS control field is used to indicate the target service type.

Optionally, a traffic identifier TID field in the QoS control field is used to indicate the target service type.

Optionally, the TID field includes 4 bits, and a most significant bit in the 4 bits is used to indicate the target service type.

Optionally, the m indication frames are further used to indicate a target start time, and a start time at which the receive end sends the n trigger frames is the target start time. It can be learned that the start time at which the receive end sends the n trigger frames may alternatively be controlled by the transmit end. Certainly, the start time at which the receive end sends the n trigger frames may not be controlled by the transmit end. For example, the receive end sends the n trigger frames immediately after receiving the m indication frames and allocating the transmission resource to the transmit end.

Optionally, the m indication frames are further used to indicate a target end time, and an end time at which the receive end sends the n trigger frames is the end time. It can be learned that the end time at which the receive end sends the n trigger frames may alternatively be controlled by the transmit end. Certainly, the end time at which the receive end sends the n trigger frames may not be controlled by the transmit end. For example, the end time may be a default time, or the receive end continuously sends the trigger frames. It should be noted that the m indication frames may be used to indicate the target start time, or may not be used to indicate the target start time.

Optionally, the m indication frames include an add traffic stream ADDTS request frame used to indicate the target service type and the target time interval.

Optionally, a traffic specification TSPEC element in the ADDTS request frame is used to indicate the target service type and the target time interval.

Optionally, the TSPEC element in the ADDTS request frame includes a service type indication field, a trigger interval field, a start time field, an end time field, and a data volume indication field. The service type indication field is used to indicate the target service type. The trigger interval field is used to indicate the target time interval. The start time field is used to indicate the target start time, and the start time at which the receive end sends the n trigger frames is the target start time. The end time field is used to indicate the target end time, and the end time at which the receive end sends the n trigger frames is the end time. The data volume indication field is used to indicate the target data volume, the target data volume is the data volume of the data that is of the first service and that is buffered by the transmit end, and the sum of the sizes of the transmission resources indicated by the n trigger frames is positively correlated with the target data volume.

Optionally, in the TSPEC element, the service type indication field, the data volume indication field, the trigger interval field, the start time field, and the end time field are sequentially arranged.

Optionally, the TSPEC element further includes an element identifier field, a length field, and a traffic stream information field. In the TSPEC element, the element identifier field, the length field, the TS information field, the service type indication field, the data volume indication field, the trigger interval field, the start time field, and the end time field are sequentially arranged.

Optionally, before the receiving n trigger frames sent by the receive end based on the m indication frames, the method further includes: receiving an ADDTS response frame that is of the ADDTS request frame and that is sent by the receive end, where the ADDTS response frame is used to indicate the target time interval, the target start time, and the target end time.

Optionally, the TSPEC element includes an element identifier field, a length field, a traffic stream information field, and another field. The another field is used to indicate the target service type, the target time interval, the target start time, the target end time, and the target data volume. The start time at which the receive end sends the n trigger frames is the target start time, the end time at which the receive end sends the n trigger frames is the end time, the target data volume is the data volume of the data that is of the first service and that is buffered by the transmit end, and the sum of the sizes of the transmission resources indicated by the n trigger frames is positively correlated with the target data volume.

Optionally, the m indication frames include m target wake time TWT request frames. The sending m indication frames to the receive end includes: sequentially sending the m TWT request frames to the receive end, where all of the m TWT request frames are used to indicate the target service type, some or all of the TWT request frames are used to indicate a time interval that is requested by the transmit end and at which the receive end sends every two trigger frames, and a time interval indicated by a last TWT request frame in the m TWT request frames is the target time interval. The method further includes: each time one TWT request frame is sent to the receive end, receiving a TWT response frame that is of the TWT request frame and that is sent by the receive end, where the TWT response frame is used to indicate the target service type and a time interval that is allowed by the receive end and at which the receive end sends every two trigger frames, and a time interval indicated by a TWT response frame of the last TWT request frame is the target time interval.

Optionally, the TWT response frame and the some or all of the TWT request frames each include an individual target wake time TWT parameter set field. In each of the some or all of the TWT request frames, the individual TWT parameter set field is used to indicate the target service type and the time interval that is requested by the transmit end and at which the receive end sends every two trigger frames. In the TWT response frame, the individual TWT parameter set field is used to indicate the target service type and the time interval that is allowed by the receive end and at which the receive end sends every two trigger frames.

Optionally, in each of the TWT response frame and the some or all of the TWT request frames, the individual TWT parameter set field includes a request type field used to indicate the target service type.

Optionally, in each of the TWT response frame and the some or all of the TWT request frames, the request type field includes a TWT request field, a TWT setup command field, and a service type indication field, and the service type indication field is used to indicate the target service type. Alternatively, in each of the some or all of the TWT request frames, the request type field includes a TWT request field and a TWT setup command field. The TWT request field and the TWT setup command field are used to indicate the target service type, a value of the TWT request field is 1, and a value of the TWT setup command field is 3, 4, 5, 6, or 7. In the TWT response frame, the value of the TWT request field is 0, and the value of the TWT setup command field is 0, 1, or 2.

Optionally, in the request type field in each of the TWT response frame and the some or all of the TWT request frames, the TWT request field, the TWT setup command field, and the service type indication field are sequentially arranged.

Optionally, when the request type field in each of the TWT response frame and the some or all of the TWT request frames includes the service type indication field, the request type field in each of the TWT response frame and the some or all of the TWT request frames further includes a TWT protection field, and the TWT protection field is located between the TWT setup command field and the service type indication field.

Optionally, the TWT request field and the TWT setup command field in the TWT request frame are further used to indicate that a TWT type is a request type, a suggest type, or a command type. The TWT request field and the TWT setup command field in the TWT response frame are used to indicate that a TWT type is an accept type, a modifiable type, or a command type.

Optionally, the individual TWT parameter set field in each of the TWT request frame and the TWT response frame further includes a TWT wake interval mantissa field and a TWT field. In the TWT request frame, when the TWT type indicated by the TWT request field and the TWT setup command field is the suggest type or the command type, the TWT wake interval mantissa field is used to indicate the time interval that is requested by the transmit end and at which the receive end sends every two trigger frames, and the TWT field is used to indicate a start time that is requested by the transmit end and at which the receive end sends the n trigger frames. A start time indicated by the last TWT request frame is the target start time. In the TWT response frame, the TWT wake interval mantissa field is used to indicate the time interval that is allowed by the receive end and at which the receive end sends every two trigger frames, and the TWT field is used to indicate a start time that is allowed by the receive end and at which the receive end sends the n trigger frames. A start time indicated by the TWT response frame of the last TWT request frame is the target start time.

Optionally, the individual TWT parameter set field in the TWT request frame further includes a TWT group assignment field used to indicate the target data volume, the target data volume is the data volume of the data that is of the first service and that is buffered by the transmit end, and the sum of the sizes of the transmission resources indicated by the n trigger frames is positively correlated with the target data volume.

According to a second aspect, a data transmission method is provided and is applied to a receive end. The method includes: receiving m indication frames sent by a transmit end, where m≥1, and the m indication frames are used to indicate a target service type and a target time interval; sending n trigger frames to the receive end based on the m indication frames, where n≥1, the trigger frame is used to indicate a transmission resource allocated to the transmit end, and the transmission resource is used to transmit data of a service of the target service type; and when n>1, a time interval at which the receive end sends the trigger frame every two adjacent times is less than or equal to the target time interval; and each time one trigger frame is sent, receiving, by using a transmission resource indicated by the trigger frame, data that is of a first service of the target service type and that is sent by the transmit end.

Optionally, the m indication frames are further used to indicate to start to send the n trigger frames. After the receiving m indication frames sent by a transmit end, the method further includes: receiving an end indication frame sent by the transmit end, where the end indication frame is used to indicate the target service type and indicate to stop sending the trigger frame; and stopping, based on the end indication frame, sending the n trigger frames to the transmit end. It can be learned that a start time and an end time at which the receive end sends the n trigger frames may be controlled by the transmit end.

Optionally, the m indication frames include a first indication frame used to indicate the target service type and a second indication frame used to indicate the target time interval, and the receiving m indication frames sent by a transmit end includes: sequentially receiving the second indication frame and the first indication frame that are sent by the transmit end.

Optionally, the m indication frames include an ADDTS request frame, and a TSPEC element in the ADDTS request frame includes a service type indication field, a trigger interval field, a start time field, and an end time field. The service type indication field is used to indicate the target service type. The trigger interval field is used to indicate the target time interval. The start time field is used to indicate a target start time, and the start time at which the receive end sends the n trigger frames is the target start time. The end time field is used to indicate a target end time, and the end time at which the receive end sends the n trigger frames is the end time. After the receiving m indication frames sent by a transmit end, the method further includes: sending an ADDTS response frame of the ADDTS request frame to the transmit end, where the ADDTS response frame is used to indicate the target time interval, the target start time, and the target end time.

Optionally, the m indication frames include m target wake time TWT request frames, and the receiving m indication frames sent by a transmit end includes: sequentially receiving the m TWT request frames sent by the transmit end, where all of the m TWT request frames are used to indicate the target service type, some or all of the TWT request frames are used to indicate a time interval that is requested by the transmit end and at which the receive end sends every two trigger frames, and a time interval indicated by a last TWT request frame in the m TWT request frames is the target time interval. The method further includes: each time one TWT request frame sent by the transmit end is received, sending a TWT response frame of the TWT request frame to the transmit end, where the TWT response frame is used to indicate the target service type and a time interval that is allowed by the receive end and at which the receive end sends every two trigger frames, and a time interval indicated by a TWT response frame of the last TWT request frame is the target time interval.

According to a third aspect, a data transmission apparatus is provided and is used for a transmit end. The data transmission apparatus includes a unit configured to perform the data transmission method according to the first aspect.

According to a fourth aspect, a data transmission apparatus is provided and is used for a receive end. The data transmission apparatus includes a unit configured to perform the data transmission method according to the second aspect.

According to a fifth aspect, a data transmission apparatus is provided and is used for a transmit end. The data transmission apparatus includes at least one processor, at least one interface, a memory, and at least one communication bus. The processor is configured to execute a program stored in the memory, to implement the data transmission method according to the first aspect.

According to a sixth aspect, a data transmission apparatus is provided and is used for a receive end. The data transmission apparatus includes a processor, a communication interface, a memory, and a bus. The processor is configured to execute a program stored in the memory, to implement the data transmission method according to the second aspect.

According to a seventh aspect, a data transmission system is provided, and the data transmission system includes a transmit end and at least one receive end. The transmit end includes the data transmission apparatus according to the third aspect, and the receive end includes the data transmission apparatus according to the fourth aspect. Alternatively, the transmit end includes the data transmission apparatus according to the fifth aspect, and the receive end includes the data transmission apparatus according to the sixth aspect.

According to an eighth aspect, a computer-readable storage medium is provided, and the storage medium stores a computer program.

When the computer program is executed by a processor, the data transmission method according to the first aspect is implemented. Alternatively, when the computer program is executed by a processor, the data transmission method according to the second aspect is implemented.

According to a ninth aspect, a computer program product including instructions is provided. When the computer program product runs on a computer, the computer performs the data transmission method according to the first aspect or the second aspect.

BRIEF DESCRIPTION OF THE DRAWINGS

FIG. 3 is a schematic diagram of a structure of BSR control information in a first indication frame according to an embodiment of this application;

FIG. 4 is a schematic diagram of a structure of BSR control information according to a related technology;

FIG. 5 is a schematic diagram of a structure of a TSPEC element according to an embodiment of this application;

FIG. 6 is a schematic diagram of a structure of a TSPEC element in an ADDTS request frame according to a related technology;

FIG. 7 is a schematic diagram of a structure of a request type field according to an embodiment of this application;

DETAILED DESCRIPTION OF ILLUSTRATIVE EMBODIMENTS

To make principles and technical solutions of this application clearer, the following further describes implementations of this application in detail with reference to accompanying drawings.

Figure 1:
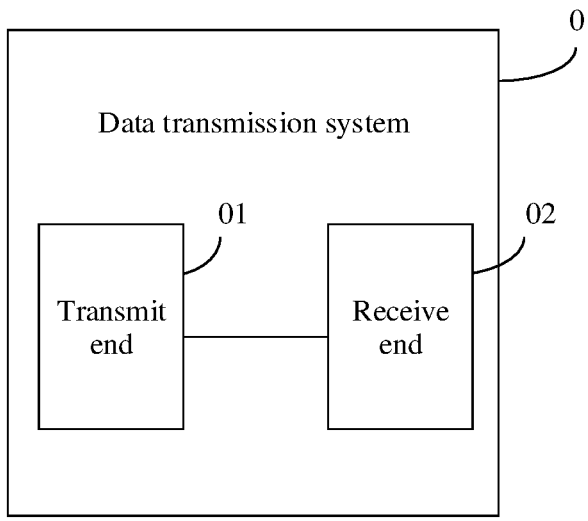
FIG. 1 is a schematic diagram of a structure of a data transmission system according to an embodiment of this application.

FIG. 1 is a schematic diagram of a structure of a data transmission system 0 according to an embodiment of this application. As shown in FIG. 1, the data transmission system 0 may include a transmit end 01 and a receive end 02. It should be noted that the data transmission system 0 may include one or more transmit ends 01 and one or more receive ends 02. FIG. 1 shows only one transmit end 01 and one receive end 02.

The transmit end 01 and the receive end 02 each may use a WLAN technology. For example, the transmit end 01 and the receive end 02 use a Wi-Fi technology in the WLAN technology. In this case, the transmit end 01 may be a station (STA), and the receive end 02 may be a wireless access point (AP). In another example, the transmit end 01 and the receive end 02 each use a cellular network technology in the WLAN technology. In this case, the transmit end 01 may be user equipment (UE), and the receive end 02 may be a base station or the like.

In a related technology, when a transmit end needs to send service data to a receive end, the transmit end may fail to obtain a transmission resource through contention. Consequently, the service data cannot be rapidly transmitted to the receive end, and a transmission delay of the service data occurs. This affects a normal operation of a service, and especially affects a normal operation of a delay-sensitive service that requires a low delay. The delay-sensitive service may be an online game service, a live video service, or the like. Embodiments of this application provide a data transmission method. In the data transmission method, a transmission delay of service data can be reduced, and especially a delay of data of a delay-sensitive service can be reduced.

Figure 2:
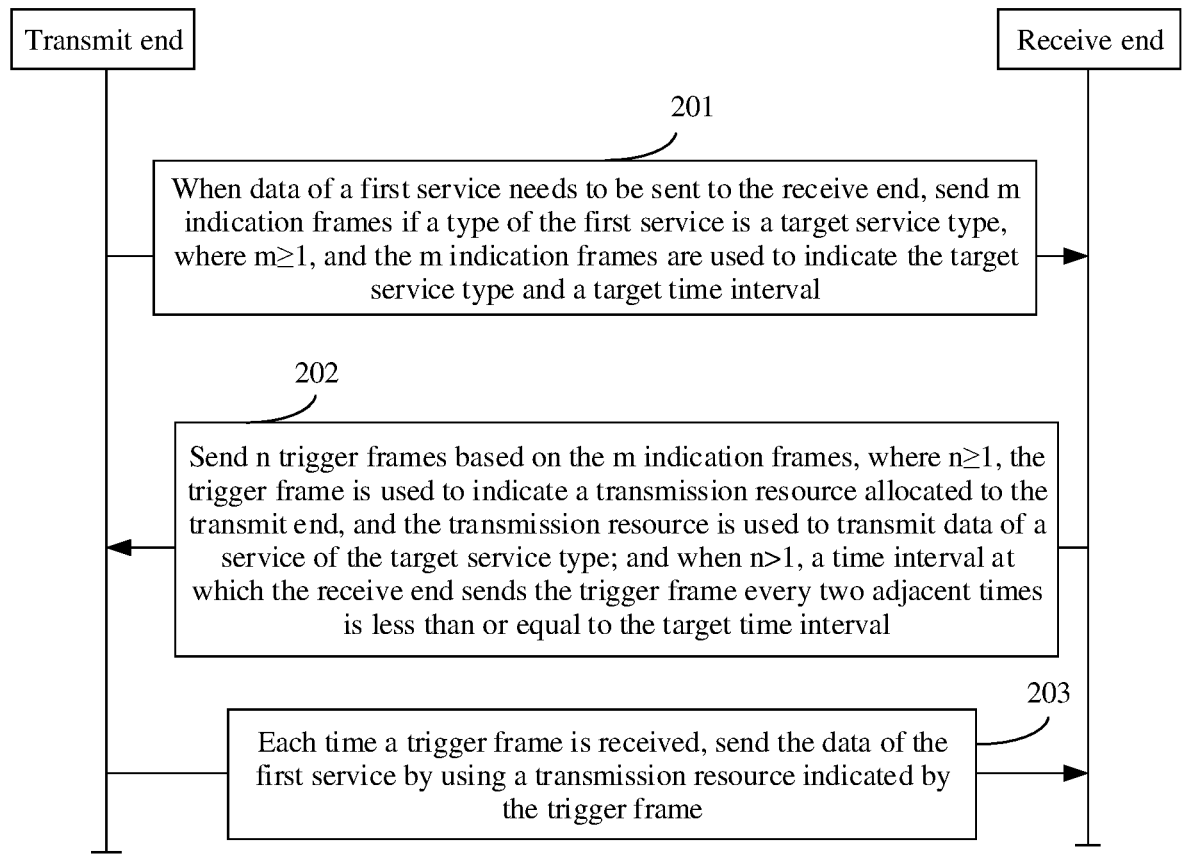
FIG. 2 is a flowchart of a data transmission method according to an embodiment of this application.

For example, FIG. 2 is a flowchart of a data transmission method according to an embodiment of this application. As shown in FIG. 2, the data transmission method may include the following steps.

Step 201: When a transmit end needs to send data of a first service to a receive end, the transmit end sends m indication frames to the receive end if a type of the first service is a target service type, where m≥1, and the m indication frames are used to indicate the target service type and a target time interval.

It should be noted that data that needs to be transmitted by the transmit end may be data generated by the transmit end, or may be data received by the transmit end from another apparatus. This is not limited in this embodiment of this application. The transmit end has a transmit queue. When data is buffered in the transmit queue, the transmit end may determine that the data needs to be sent.

The first service may be any type of service. In this case, the target service type may be any service type. For example, the target service type is a delay-sensitive service type that requires a low delay, or the target service type may be a service type that requires high transmission quality. Details are not described herein in this embodiment of this application.

When the transmit end needs to send the data of the first service to the receive end, the transmit end may first determine whether the type of the first service is the target service type. When the type of the first service is the target service type, the transmit end may immediately send the m indication frames to the receive end.

Step 202: The receive end sends n trigger frames to the transmit end based on the m indication frames, where n≥1, the trigger frame is used to indicate a transmission resource allocated to the transmit end, and the transmission resource is used to transmit data of a service of the target service type; and when n>1, a time interval at which the receive end sends the trigger frame every two adjacent times is less than or equal to the target time interval.

Optionally, the receive end manages some transmission resources, and the receive end has a capability of allocating these transmission resources to the receive end. When receiving the m indication frames sent by the transmit end, the receive end may parse the m indication frames to determine that in this case, the transmit end needs to send the data of the service of the target service type. In this case, the receive end may allocate, to the receive end, a transmission resource in the transmission resources managed by the receive end, and the transmission resource is used to transmit only the data of the service of the target service type. Each time the receive end allocates a transmission resource to the transmit end, the receive end sends, to the transmit end, a trigger frame used to indicate the transmission resource.

The receive end may perform the step of allocating the transmission resource to the transmit end n times. Correspondingly, the receive end also sends, to the transmit end, the n trigger frames used to indicate transmission resources allocated n times. It should be noted that the transmission resources allocated by the receive end n times may be different from each other, or there may be same transmission resources. This is not limited in this embodiment of this application.

In addition, a quantity of trigger frames sent by the receive end to the transmit end may be equal to 1, or may be greater than 1. Moreover, when the quantity of trigger frames sent by the receive end to the transmit end is greater than 1, the n trigger frames may be simultaneously sent from the receive end, or may be sent from the receive end at different times. This is not limited in this embodiment of this application. It should be noted that if n>1, when sending the n trigger frames to the transmit end, the receive end may send the n trigger frames based on the target time interval indicated by the m indication frames, so that the time interval at which the receive end sends the trigger frame every two adjacent times is less than or equal to the target time interval. Optionally, the receive end may periodically send the n trigger frames, or certainly may aperiodically send the n trigger frames. This is not limited in this embodiment of this application.

Step 203: Each time the transmit end receives one trigger frame, the transmit end sends the data of the first service to the receive end by using a transmission resource indicated by the trigger frame.

Each time the transmit end receives one trigger frame, the transmit end may parse the trigger frame to determine a transmission resource indicated by the trigger frame. Then the transmit end may send the data of the first service to the receive end by using the transmission resource.

In addition, because the transmission resource is allocated to the transmit end and is used to transmit the data of the service of the target service type, a problem that a transmission delay of the data of the first service is caused when the transmit end fails to obtain a transmission resource through contention does not exist. Moreover, when n>1, the time interval at which the receive end sends the trigger frame every two adjacent times is less than or equal to the target time interval. In this way, each time the transmit end receives or generates the data of the first service, the transmit end can send the data of the first service to the receive end after waiting for a maximum of the target time interval. This reduces a delay of sending the data of the first service by the transmit end.

In conclusion, in the data transmission method provided in this embodiment of this application, if the type of the first service is the target service type, before sending the data of the first service to the receive end, the transmit end may send, to the receive end, the m indication frames used to indicate the target service type. After receiving the m indication frames, the receive end may pre-allocate, based on the m indication frames, the transmission resource to the data that is of the service of the target service type and that is to be transmitted by the transmit end, and indicate the transmission resource by sending the trigger frame to the transmit end. In this way, a data transmission delay caused when the transmit end fails to obtain a transmission resource through contention is avoided. This ensures a normal operation of the service.

Optionally, the m indication frames are further used to indicate target duration, and the target duration is greater than or equal to duration in which the receive end sends the n trigger frames. For example, the target duration indicated by the m indication frames in this embodiment of this application may from 1 second to 10 second (including 1 and 10). The duration in which the receive end sends the n trigger frames in step 203 is the target duration indicated by the m indication frames. It can be learned that the duration in which the receive end sends the n trigger frames in step 203 is controlled by the transmit end. Certainly, the duration in which the receive end sends the n trigger frames may not be controlled by the transmit end, for example, the duration is default duration at the receive end.

Optionally, the m indication frames are further used to indicate a target start time at which the receive end sends the n trigger frames. In this case, a start time at which the receive end sends the n trigger frames in step 203 is the target start time indicated by the m indication frames. It can be learned that the start time at which the receive end sends the n trigger frames in step 203 may alternatively be controlled by the transmit end. Certainly, the start time at which the receive end sends the n trigger frames may not be controlled by the transmit end. For example, the receive end sends the n trigger frames immediately after receiving the m indication frames and allocating the transmission resource to the transmit end.

Optionally, when the m indication frames are not used to indicate the target duration, the m indication frames are further used to indicate a target end time at which the receive end sends the n trigger frames. In this case, an end time at which the receive end sends the n trigger frames in step 203 is the target end time indicated by the m indication frames. It can be learned that the end time at which the receive end sends the n trigger frames in step 203 may alternatively be controlled by the transmit end. Certainly, the end time at which the receive end sends the n trigger frames may not be controlled by the transmit end. For example, the end time may be a default time, or the receive end continuously sends the trigger frames. It should be noted that the m indication frames may be used to indicate the target start time, or may not be used to indicate the target start time.

Optionally, when the m indication frames are not used to indicate the target start time, the m indication frames are further used to indicate to start to send the trigger frame. In this case, in step 203, the receive end may send the n trigger frames to the transmit end immediately after receiving the m indication frames and allocating the transmission resource to the transmit end. It can be learned that the start time at which the receive end sends the n trigger frames in step 203 is controlled by the transmit end.

Optionally, if the m indication frames are not used to indicate the target duration, regardless of whether the m indication frames are used to indicate the receive end to start to send the trigger frame, the data transmission method shown in FIG. 2 may further include: The transmit end sends an end indication frame to the receive end after sending the m indication frames to the receive end. The end indication frame is used to indicate the target service type and indicate to stop sending the trigger frame. After receiving the end indication frame, the receive end may stop sending the trigger frame to the transmit end. The end time at which the receive end sends the n trigger frames in step 203 is a time at which the receive end receives the end indication frame. It can be learned that the end time at which the receive end sends the n trigger frames in step 203 may alternatively be controlled by the transmit end. Certainly, the end time at which the receive end sends the n trigger frames may not be controlled by the transmit end. For example, the receive end may stop sending the trigger frame at a default time after the trigger frame is sent.

Optionally, the m indication frames may be further used to indicate a target data volume, and the target data volume is a data volume of the data that is of the first service and that is buffered by the transmit end (for example, buffered in the transmit queue of the transmit end). In this case, in step 202, the receive end may allocate the transmission resource to the transmit end based on the target data volume, and a sum of sizes of the transmission resources allocated by the receive end to the transmit end n times is positively correlated with the target data volume. For example, when the target data volume is large, the sum of the sizes of the transmission resources allocated by the receive end to the transmit end n times is large. When the target data volume is small, the sum of the sizes of the transmission resources allocated by the receive end to the transmit end n times is small. Certainly, the m indication frames may not be used to indicate the target data volume.

Optionally, both the m indication frames and each trigger frame may be further used to indicate an identifier of the first service, and the transmission resource allocated by the receive end to the transmit end is used to transmit the data of the first service. In other words, the transmission resource allocated by the receive end to the transmit end is used to transmit data of a specific service (the first service). When the transmit end has to-be-transmitted data of a plurality of services, and types of the plurality of services each are the target service type, the receive end can allocate, to the transmit end, a transmission resource used to transmit data of each service. In addition, because the transmission resource allocated by the receive end to the transmit end is used to transmit data of only one service, efficiency of transmitting to-be-transmitted data on the transmission resource is high. Certainly, the m indication frames may not be used to indicate the identifier of the first service. This is not limited in this embodiment of this application.

The m indication frames in this embodiment of this application may have a plurality of implementations. In this embodiment of this application, the following several implementations are used as examples to explain and describe the m indication frames.

In a first implementation of the m indication frames, the m indication frames may include a first indication frame, and the first indication frame includes buffer status report (Buffer Status Report, BSR) control information. The BSR control information may be used to indicate the target service type and the target time interval.

Optionally, the BSR control information in the first indication frame may include an access category index bitmap field and a traffic identifier difference (Delta TID) field that are used to indicate the target service type, and a trigger interval field used to indicate the target time interval.

In a related technology, the ACI bitmap field and the traffic identifier difference field in the BSR control information are used together to indicate a quantity of traffic identifiers (TIDs) corresponding to data that is to be transmitted by the transmit end. For example, the ACI bitmap field includes 4 bits in total, and the traffic identifier difference field includes 2 bits in total.

As shown in Table 1, if a value of the ACI bitmap field is 0, when a value of the traffic identifier difference field is 3, the quantity of TIDs indicated by using the ACI bitmap field and the traffic identifier difference field is 8.

If a value of the ACI bitmap field is 1, when a value of the traffic identifier difference field is 0, the quantity of TIDs indicated by using the ACI bitmap field and the traffic identifier difference field is 1; and when a value of the traffic identifier difference field is 1, the quantity of TIDs indicated by using the ACI bitmap field and the traffic identifier difference field is 2.

If a value of the ACI bitmap field is 2, when a value of the traffic identifier difference field is 0, the quantity of TIDs indicated by using the ACI bitmap field and the traffic identifier difference field is 2. When a value of the traffic identifier difference field is 1, the quantity of TIDs indicated by using the ACI bitmap field and the traffic identifier difference field is 3. When a value of the traffic identifier difference field is 2, the quantity of TIDs indicated by using the ACI bitmap field and the traffic identifier difference field is 4.

If a value of the ACI bitmap field is 3, when a value of the traffic identifier difference field is 0, the quantity of TIDs indicated by using the ACI bitmap field and the traffic identifier difference field is 3; when a value of the traffic identifier difference field is 1, the quantity of TIDs indicated by using the ACI bitmap field and the traffic identifier difference field is 4; when a value of the traffic identifier difference field is 2, the quantity of TIDs indicated by using the ACI bitmap field and the traffic identifier difference field is 5; and when a value of the traffic identifier difference field is 3, the quantity of TIDs indicated by using the ACI bitmap field and the traffic identifier difference field is 6.

If a value of the ACI bitmap field is 4, when a value of the traffic identifier difference field is 0, the quantity of TIDs indicated by using the ACI bitmap field and the traffic identifier difference field is 4; when a value of the traffic identifier difference field is 1, the quantity of TIDs indicated by using the ACI bitmap field and the traffic identifier difference field is 5; when a value of the traffic identifier difference field is 2, the quantity of TIDs indicated by using the ACI bitmap field and the traffic identifier difference field is 6; and when a value of the traffic identifier difference field is 3, the quantity of TIDs indicated by using the ACI bitmap field and the traffic identifier difference field is 7.

TABLE 1

| Value of an ACI bitmap field | Value of a traffic identifier difference field | Quantity of TIDs |
|---|---|---|
| 0 | 3 | 8 |
| 1 | 0 | 1 |
|   | 1 | 2 |
| 2 | 0 | 2 |
|   | 1 | 3 |
|   | 2 | 4 |
| 3 | 0 | 3 |
|   | 1 | 4 |
|   | 2 | 5 |
|   | 3 | 6 |
| 4 | 0 | 4 |
|   | 1 | 5 |
|   | 2 | 6 |
|   | 3 | 7 |

It can be learned from Table 1 that in the related technology, when the value of the ACI bitmap field is 0, none of the values 0, 1, and 2 of the traffic identifier difference field has any meaning; when the value of the ACI bitmap field is 1, neither the value 2 nor the value 3 of the traffic identifier difference field has any meaning; and when the value of the ACI bitmap field is 2, the value 3 of the traffic identifier difference field does not have any meaning. Therefore, in this embodiment of this application, these state values that do not have any meaning in the related technology may be used to indicate the target service type. To be specific, when the value of the ACI bitmap field is 0 and the value of the traffic identifier difference field is 0, 1, or 2, the ACI bitmap field and the traffic identifier difference field indicate the target service type. When the value of the ACI bitmap field is 1 and the value of the traffic identifier difference field is 2 or 3, the ACI bitmap field and the traffic identifier difference field indicate the target service type. When the value of the ACI bitmap field is 2 and the value of the traffic identifier difference field is 3, the ACI bitmap field and the traffic identifier difference field indicate the target service type.

Optionally, when the m indication frames are further used to indicate the target duration, the BSR control information in the first indication frame may further include duration indication field used to indicate the target duration. When the m indication frames are further used to indicate the target data volume, the BSR control information in the first indication frame may further include a data volume indication field used to indicate the target data volume. In this embodiment of this application, that the first indication frame includes both the duration indication field and the data volume indication field is used as an example.

For example, the trigger interval field and the duration indication field may include 10 bits in total. For example, the trigger interval field includes 4 bits, and can indicate 16 different time intervals in total. The duration indication field includes 6 bits, and can indicate 64 different types of duration. Alternatively, the trigger interval field includes 5 bits, and the duration indication field also includes 5 bits. Optionally, in the BSR control information in the first indication frame, the ACI bitmap field, the traffic identifier difference field, the data volume indication field, the trigger interval field, and the duration indication field are sequentially arranged.

Further, the first indication frame may include a scaling factor (Scaling Factor) field. For example, FIG. 3 is a schematic diagram of a structure of the BSR control information in the first indication frame according to an embodiment of this application. As shown in FIG. 3, in the BSR control information in the first indication frame, the ACI bitmap field, the traffic identifier difference field, the scaling factor field, the data volume indication field, the trigger interval field, and the duration indication field are sequentially arranged.

It should be noted that FIG. 4 is a schematic diagram of a structure of BSR control information according to a related technology. As shown in FIG. 4, the BSR control information in the related technology may include an ACI bitmap field, a traffic identifier difference field, an access category index high (ACI High) field, a scaling factor field, a queue size high field, and a queue size all field that are sequentially arranged. The ACI bitmap field includes 4 bits, the traffic identifier difference field includes 2 bits, the access category index high field includes 2 bits, the scaling factor field includes 2 bits, the queue size high field includes 8 bits, and the queue size all field includes 8 bits. Through comparison between the BSR control information (shown in FIG. 3) in the first indication frame in this application and the BSR control information (shown in FIG. 4) in the related technology, it can be learned that in this application, the access category index high field and the queue size all field in the related technology are replaced with the trigger interval field and the duration indication field, and both the trigger interval field and the duration indication field are placed after the data volume indication field. In addition, in this application, the queue size high field in the related technology is further replaced with the data volume indication field.

Further, in the BSR control information in the first indication frame, the ACI bitmap field and the traffic identifier difference field may be used to indicate an access category (AC) of the data of the first service. For example, four states in six states that are not used in Table 1 (when the value of the ACI bitmap field is 0, the value of the traffic identifier difference field is 0, 1, or 2; when the value of the ACI bitmap field is 1, the value of the traffic identifier difference field is 2 or 3; and when the value of the ACI bitmap field is 2, the value of the traffic identifier difference field is 3) may respectively indicate four different ACs.

In addition, in step 202, an AC of data transmitted by using the transmission resource that is allocated by the receive end to the transmit end is the same as the AC (that is, the AC of the data of the first service) indicated by the first indication frame. In this way, it can be ensured that the transmission resource allocated by the receive end to the transmit end is used to transmit data of only one AC. This improves efficiency of transmitting the data of the first service on the transmission resource.

Optionally, the first indication frame may further include a quality of service (QoS) control field, and the QoS field may also be used to indicate the target service type. Optionally, the QoS control field includes a TID field, and the TID field is used to indicate the target service type. For example, the TID field includes 4 bits, and a most significant bit in the 4 bits in the related technology does not indicate any meaning. Therefore, in this embodiment of this application, the most significant bit in the 4 bits may be used to indicate the target service type. For example, when a value of the most significant bit is 1, the most significant bit may be used to indicate the target service type; and when the value of the most significant bit is 0, the most significant bit may be used to indicate a non-target service type.

Optionally, the first indication frame may include a high throughput (HT) control field, and the HT control field may include the BSR control information. The QoS control field may be located outside the HT control field.

In a second implementation of the m indication frames, the m indication frames still include a first indication frame, and in this case, a structure of the first indication frame may be similar to a structure of the first indication frame in the first implementation. For example, the duration indication field in the first indication frame in the first implementation may be deleted, and a start trigger field used to indicate the receive end to start to send the n trigger frames is added to the first indication frame.

Optionally, in the BSR control information in the first indication frame, the ACI bitmap field, the traffic identifier difference field, the scaling factor field, the data volume indication field, the trigger interval field, and the start trigger field are sequentially arranged. The trigger interval field and the start trigger field may include 10 bits in total. For example, the trigger interval field includes 9 bits (which can indicate 512 different time intervals in total), and the start trigger field includes 1 bit. For example, when a value of the 1 bit of the start trigger field is 1, the start trigger field may be used to indicate to start to send the n trigger frames.

When the first indication frame includes the start trigger field, after the transmit end sends the first indication frame to the receive end in step 201, the data transmission method provided in this embodiment of this application may further include: When there is no need to send the data of the first service to the receive end, the transmit end sends an end indication frame including BSR control information to the receive end. The BSR control information in the end indication frame includes an ACI bitmap field and a traffic identifier difference field that are used to indicate the target service type, and a stop trigger field used to indicate to stop sending the n trigger frames. A quantity of bits of the stop trigger field may be the same as a quantity of bits of the start trigger field, for example, quantities of bits of the two fields both are 1. For example, when a value of the stop trigger field is 0, the stop trigger field may be used to indicate to stop sending the n trigger frames; or when a value of the stop trigger field is 1, the stop trigger field may be used to indicate to stop sending the n trigger frames.

It should be noted that in the second implementation of the m indication frames, the first indication frame is used to indicate the receive end to start to send the trigger frame, and the transmit end indicates, by using the end indication frame, the receive end to stop sending the trigger frame. The end indication frame does not need to indicate the target time interval and the target data volume.

In the second implementation of the first indication frame, the ACI bitmap field and the traffic identifier difference field in each of the first indication frame and the end indication frame are further used to indicate an AC of the data of the first service. An AC of data transmitted by using the transmission resource that is allocated by the receive end to the transmit end is the same as the AC indicated by the first indication frame (or the end indication frame).

In a third implementation of the m indication frames, the m indication frames include a first indication frame and a second indication frame. The first indication frame is used to indicate the target service type, and the second indication frame is used to indicate the target time interval. Optionally, the transmit end may first send the second indication frame to the receive end, and then send the first indication frame to the receive end. The second indication frame may also be used to indicate the target service type.

For example, the first indication frame may include only the QoS control field, and does not include the BSR control information. In this case, the QoS control field may be used to indicate the target service type. For example, the TID field in the QoS control field is used to indicate the target service type. For example, the TID field includes 4 bits, and a most significant bit in the 4 bits is used to indicate the target service type. The second indication frame may be a beacon frame or another type of data frame. This is not limited in this embodiment of this application.

It can be learned that in the third implementation of the m indication frames, the first indication frame does not indicate the target time interval, and before sending the first indication frame, the transmit end may send, to the receive end, the second indication frame used to indicate the target time interval.

Optionally, in the third implementation of the m indication frames, each indication frame (for example, the first indication frame or the second indication frame) sent by the transmit end is further used to indicate an identifier of the first service, and the transmission resource allocated by the receive end to the transmit end is used to transmit the data of the first service. For example, the first indication frame and the second indication frame each may further include a service identifier field used to indicate the identifier of the first service.

In a fourth implementation of the m indication frames, the m indication frames may include an add traffic stream (ADDTS) request frame used to indicate the target service type and the target time interval.

Optionally, the ADDTS request frame includes a traffic specification (TSPEC) element, and the TSPEC element may be used to indicate the target service type and the target time interval.

Optionally, the TSPEC element in the ADDTS request frame may include a service type indication field used to indicate the target service type, and a trigger interval field used to indicate the target time interval.

For example, the service type indication field may include one or more bits. For example, the service type indication field includes 1 bit, and when a value of the bit is 1, the service type indication field may be used to indicate that a service type is the target service type.

Optionally, the TSPEC element in the ADDTS request frame further includes a start time field, an end time field, and a data volume indication field. The start time field is used to indicate a target start time at which the receive end sends the n trigger frames, the end time field is used to indicate a target end time at which the receive end sends the n trigger frames, the data volume indication field is used to indicate the target data volume that is of the data of the first service and that is buffered by the transmit end, and the sum of the sizes of the transmission resources indicated by the n trigger frames sent by the receive end is positively correlated with the target data volume. Optionally, in the TSPEC element, the service type indication field, the data volume indication field, the trigger interval field, the start time field, and the end time field are sequentially arranged.

Optionally, the TSPEC element further includes an element identifier field, a length field, and a traffic stream (TS) information field. FIG. 5 is a schematic diagram of a structure of the TSPEC element according to an embodiment of this application. As shown in FIG. 5, in the TSPEC element, the element identifier field, the length field, the TS information field, the service type indication field, the data volume indication field, the trigger interval field, the start time field, and the end time field are sequentially arranged.

FIG. 6 is a schematic diagram of a structure of a TSPEC element in an ADDTS request frame according to a related technology. As shown in FIG. 6, the TSPEC element in the related technology also includes an element identifier field (including 1 bit), a length field (including 1 bit), and a TS information field (including 3 bits), and the TSPEC element further includes another field. In this embodiment of this application, the another field in the TSPEC element in the related technology is replaced with the service type indication field, the data volume indication field, the trigger interval field, the start time field, and the end time field, to obtain the TSPEC element shown in FIG. 5. Alternatively, some bits in the another field may be replaced with the service type indication field, the data volume indication field, the trigger interval field, the start time field, and the end time field, to obtain the TSPEC element in the ADDTS request frame provided in this embodiment of this application. In addition, the TSPEC element may further include a bit other than the element identifier field, the length field, the TS information field, the service type indication field, the data volume indication field, the trigger interval field, the start time field, and the end time field.

Optionally, in the fourth implementation of the m indication frames, after step 201, the data transmission method provided in this embodiment of this application may further include: The receive end sends an ADDTS response frame of the ADDTS request frame to the transmit end. The ADDTS response frame is used to indicate the target time interval, the target start time, and the target end time. It can be learned that after the transmit end sends the ADDTS request frame to the receive end, the receive end may send the ADDTS response frame of the ADDTS request frame to the transmit end, to notify the transmit end that the receive end sends the trigger frame based on the target time interval, the target start time, and the target end time that are indicated by the ADDTS request frame. Certainly, the receive end may not send the ADDTS response frame of the ADDTS request frame to the transmit end. This is not limited in this embodiment of this application.

Further, in a fourth implementation of the m indication frames, the ADDTS request frame and the ADDTS response frame of the ADDTS request frame may not include one or more of the start time field and the end time field. This is not limited in this embodiment of this application.

Optionally, in the fourth implementation of the m indication frames, each indication frame (for example, the ADDTS request frame) sent by the transmit end is further used to indicate an identifier of the first service, and the transmission resource allocated by the receive end to the transmit end is used to transmit the data of the first service. For example, the ADDTS request frame may further include a service identifier field used to indicate the identifier of the first service.

It should be noted that in the fourth implementation of the m indication frames, the TSPEC element in the ADDTS request frame may alternatively indicate the target service type, the target time interval, the target start time, the target end time, and the target data volume by using only the another field in FIG. 6.

For example, the TSPEC element includes the element identifier field, the length field, the TS information field, and the another field. The another field in FIG. 6 may include: a nominal medium access control service data unit size (Nominal MSDU Size) field, a maximum medium access control service data unit size (Maximum MSDU Size) field, a minimum service interval field, a maximum service interval field, an inactivity interval field, a suspension interval field, a service start time field, a minimum data rate field, a mean data rate field, a burst size field, a delay bound field, a minimum physical layer rate field, a surplus bandwidth allowance field, a medium time field, and a directional multi-gigabit attributes field that are sequentially arranged in a direction away from the TS information field.

One or more fields may be randomly selected from the nominal MSDU size field, the maximum MSDU size field, the minimum service interval field, the maximum service interval field, the inactivity interval field, the suspension interval field, the service start time field, the minimum data rate field, the mean data rate field, the burst size field, the delay bound field, the minimum PHY rate field, the surplus bandwidth allowance field, the medium time field, and the DMG Attributes field, to indicate the target service type, the target time interval, the target start time, the target end time, and the target data volume. For example, the burst size field may be used to indicate the target data volume, the delay bound field may be used to indicate the target time interval, the service start time field may be used to indicate the target start time, and the minimum data rate field may be used to indicate the target end time.

In a fifth possible implementation of the m indication frames, the m indication frames include m target wake time (TWT) request frames. In step 201, the transmit end may sequentially send the m TWT request frames to the receive end. In this case, the embodiment shown in FIG. 2 may further include: Each time the receive end receives one TWT request frame, the receive end sends a TWT response frame of the TWT request frame to the transmit end. All of the m TWT request frames are used to indicate the target service type, some or all of the m TWT request frames are used to indicate a time interval that is requested by the transmit end and at which the receive end sends every two trigger frames, and a time interval indicated by a last TWT request frame in the m TWT request frames is the target time interval. The TWT response frame may be used to indicate the target service type and a time interval that is allowed by the receive end and at which the receive end sends every two trigger frames, and a time interval indicated by a TWT response frame of the last TWT request frame is the target time interval.

For example, the TWT response frame and the some or all of the TWT request frames each may include an individual TWT parameter set field. In each of the some or all of the TWT request frames, the individual TWT parameter set field is used to indicate the target service type and the time interval that is requested by the transmit end and at which the receive end sends every two trigger frames. In the TWT response frame, the individual TWT parameter set field is used to indicate the target service type and the time interval that is allowed by the receive end and at which the receive end sends every two trigger frames.

Optionally, in each of the TWT response frame and the some or all of the TWT request frames, the individual TWT parameter set field includes a request type field used to indicate the target service type.

In an implementation of the request type field, in each of the TWT response frame and the some or all of the TWT request frames, the request type field includes a TWT request field, a TWT setup command field, and a service type indication field, and the service type indication field is used to indicate the target service type. Optionally, the TWT request field, the TWT setup command field, and the service type indication field are sequentially arranged. For example, FIG. 7 is a schematic diagram of a structure of the request type field according to an embodiment of this application. As shown in FIG. 7, the request type field further includes a TWT protection field. The TWT request field, the TWT setup command field, the TWT protection field, and the service type indication field are sequentially arranged. The service type indication field may include one or more bits.

Figures 8, 9:
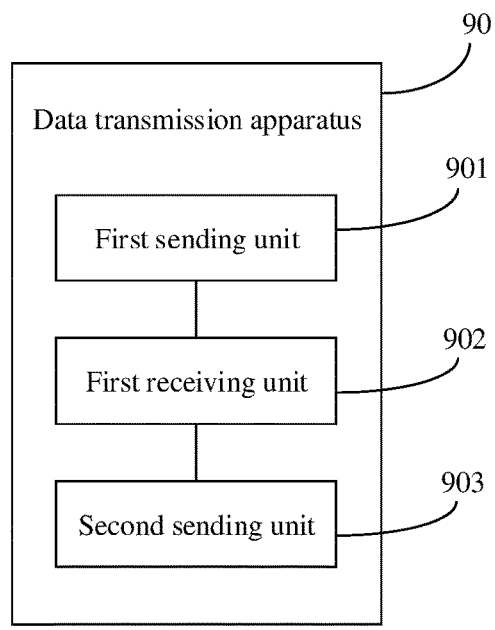
FIG. 8 is a schematic diagram of a structure of a request type field according to a related technology.
FIG. 9 is a schematic diagram of a structure of a data transmission apparatus according to an embodiment of this application.

It should be noted that FIG. 8 is a schematic diagram of a structure of a request type field according to a related technology. As shown in FIG. 8, the request type field may include a TWT request field, a TWT setup command field, a trigger field, an implicit field, a flow type field, a TWT flow identifier field, a TWT wake interval exponent field, and a TWT protection field that are sequentially arranged. Through comparison between FIG. 7 and FIG. 8, it can be learned that in this application, the service type indication field is added to the end of the request type field provided in the related technology, to obtain the request type field shown in FIG. 7.

In another implementation of the request type field, in each of the some or all of the TWT request frames, the request type field includes a TWT request field and a TWT setup command field. The TWT request field and the TWT setup command field are used to indicate the target service type, a value of the TWT request field is 1, and a value of the TWT setup command field is 3, 4, 5, 6, or 7. In the TWT response frame, the value of the TWT request field is 0, and the value of the TWT setup command field is 0, 1, or 2. In this case, neither the request type field in the TWT response frame nor the request type field in each of the some or all of TWT request frames includes a service type indication field, and the request type field has a structure similar to a structure of the request type field in the related technology.

Optionally, the TWT request field and the TWT setup command field in the TWT request frame are further used to indicate that a TWT type is a request type, a suggest type, or a command type. The TWT request field and the TWT setup command field in the TWT response frame are used to indicate that a TWT type is an accept type, a modifiable type, or a command type.

Optionally, the individual TWT parameter set field in each of the TWT request frame and the TWT response frame further includes a TWT wake interval mantissa field and a TWT field. In the TWT request frame, when the TWT type indicated by the TWT request field and the TWT setup command field is the suggest type or the command type, the TWT wake interval mantissa field is used to indicate the time interval that is requested by the transmit end and at which the receive end sends every two trigger frames, and the TWT field is used to indicate a start time that is requested by the transmit end and at which the receive end sends the n trigger frames. A start time indicated by the last TWT request frame is the target start time. When the TWT type indicated by the TWT request frame is the request type, neither the TWT field nor the TWT wake interval mantissa field may have a meaning. In the TWT response frame, the TWT wake interval mantissa field is used to indicate the time interval that is allowed by the receive end and at which the receive end sends every two trigger frames, and the TWT field is used to indicate a start time that is allowed by the receive end and at which the receive end sends the n trigger frames; and a start time indicated by the TWT response frame of the last TWT request frame is the target start time.

Further, the individual TWT parameter set field in the TWT request frame may include a TWT group assignment field used to indicate the target data volume.

In a fifth possible implementation of the m indication frames, after receiving each TWT request frame sent by the transmit end, the receive end may parse the TWT request frame to determine a TWT type indicated by the TWT request frame, and when the TWT type is a modifiable type or a command type, parse information (for example, a requested time interval and a start time) indicated by the indication frame.

On one hand, when the TWT type indicated by the TWT request frame is the request type, the receive end may modify the indication frame to obtain a TWT response frame of the TWT request frame. The value of the TWT request field in the TWT response frame is 0, and the value of the TWT setup command field in the TWT response frame is 0, 1, or 2. In addition, the TWT field in the TWT response frame is used to indicate the start time that is allowed by the receive end and at which the receive end sends the n trigger frames, and the TWT wake interval mantissa field is used to indicate the time interval that is allowed by the receive end and at which the receive end sends every two adjacent trigger frames.

On the other hand, when the TWT type indicated by the TWT request frame is the modifiable type or the command type, the transmit end needs to determine whether to accept a time interval and a start time that are indicated by the TWT request frame. In one case, the transmit end determines to accept the time interval and the start time that are indicated by the TWT request frame. In this case, the transmit end may modify the TWT request frame to obtain a TWT response frame of the TWT request frame. The TWT type indicated by the TWT response frame is the accept type, a time interval indicated by the TWT response frame is the same as the time interval indicated by the TWT request frame, and a start time indicated by the TWT response frame is the same as the start time indicated by the TWT request frame. In another case, the transmit end determines not to accept the time interval and the start time that are indicated by the TWT request frame. In this case, the transmit end may modify the TWT request frame to obtain a response frame of the TWT request frame. The TWT type indicated by the TWT response frame is the modifiable type or the command type, a time interval indicated by the TWT response frame is different from the time interval indicated by the TWT request frame, and/or a start time indicated by the TWT response frame is different from the start time indicated by the TWT request frame.

After the transmit end receives the TWT response frame of each TWT request frame sent by the transmit end, if the TWT type indicated by the TWT response frame is not the accept type (for example, the TWT type is the modifiable type or the command type), the transmit end needs to modify the TWT response frame to regenerate a TWT request frame, and further send the TWT request frame to the receive end. In addition, any two TWT request frames sent by the transmit end have a same structure, and are different in terms of one or more of an indicated start time and time interval. It should be noted that after the transmit end receives the TWT response frame of each TWT request frame sent by the transmit end, if the TWT type indicated by the TWT response frame is the accept type, the transmit end does not need to send any indication information to the receive end.

Through the foregoing interaction process performed by the transmit end and the receive end, a time interval indicated by a TWT request frame sent by the transmit end at the last time is the target time interval, and a time interval indicated by a TWT response frame sent by the receive end at the last time is also the target time interval. A start time indicated by the TWT request frame sent by the transmit end at the last time is the target start time, and a time interval indicated by the TWT response frame sent by the receive end at the last time is also the target start time.

Optionally, the TWT group assignment field in the TWT request frame is further used to indicate an end time that is requested by the transmit end and at which the receive end sends the n trigger frames, and the TWT group assignment field in the TWT response frame is further used to indicate an end time allowed by the receive end. In this case, any two TWT request frames sent by the transmit end are different in terms of one or more of an indicated start time, end time, and time interval. In addition, an end time indicated by the TWT request frame sent by the transmit end at the last time is the target end time, and an end time indicated by the TWT response frame sent by the receive end at the last time is also the target end time.

Optionally, in the fifth implementation of the m indication frames, the TWT request frame sent by the transmit end and the TWT response frame sent by the receive end are further used to indicate an identifier of the first service, and the transmission resource allocated by the receive end to the transmit end is used to transmit the data of the first service. For example, the TWT request frame and the TWT response frame each may further include a service identifier field used to indicate the identifier of the first service.

In conclusion, in the data transmission method provided in this embodiment of this application, if the type of the first service is the target service type, before sending the data of the first service to the receive end, the transmit end may send, to the receive end, the m indication frames used to indicate the target service type. After receiving the m indication frames, the receive end may pre-allocate, based on the m indication frames, the transmission resource to the data that is of the service of the target service type and that is to be transmitted by the transmit end, and indicate the transmission resource by sending the trigger frame to the transmit end. In this way, a data transmission delay caused when the transmit end fails to obtain a transmission resource through contention is avoided. This ensures a normal operation of the service.

FIG. 9 is a schematic diagram of a structure of a data transmission apparatus according to an embodiment of this application. The data transmission apparatus may be used for a transmit end. As shown in FIG. 9, the data transmission apparatus 90 may include: a first sending unit 901, configured to: when data of a first service needs to be sent to a receive end, send m indication frames to the receive end if a type of the first service is a target service type, where m≥1, and the m indication frames are used to indicate the target service type and a target time interval; a first receiving unit 902, configured to receive n trigger frames sent by the receive end based on the m indication frames, where n≥1, the trigger frame is used to indicate a transmission resource allocated to the transmit end, and the transmission resource is used to transmit data of a service of the target service type; and when n>1, a time interval at which the receive end sends the trigger frame every two adjacent times is less than or equal to the target time interval; and a second sending unit 903, configured to: each time one trigger frame is received, send the data of the first service to the receive end by using a transmission resource indicated by the trigger frame.

In conclusion, in the data transmission apparatus provided in this embodiment of this application, if the type of the first service is the target service type, before sending the data of the first service to the receive end, the first sending unit may send, to the receive end, the m indication frames used to indicate the target service type. After receiving the m indication frames, the receive end may pre-allocate, based on the m indication frames, the transmission resource to the data that is of the service of the target service type and that is to be transmitted by the transmit end, and indicate the transmission resource by sending the trigger frame to the transmit end. In this way, a data transmission delay caused when the transmit end fails to obtain a transmission resource through contention is avoided. This ensures a normal operation of the service.

Optionally, the m indication frames are further used to indicate a target data volume, the target data volume is a data volume of the data that is of the first service and that is buffered by the transmit end, and a sum of sizes of transmission resources indicated by the n trigger frames is positively correlated with the target data volume.

Optionally, the m indication frames are further used to indicate an identifier of the first service, and the transmission resource is used to transmit the data of the first service.

Optionally, the m indication frames include a first indication frame including buffer status report BSR control information, and the BSR control information in the first indication frame is used to indicate the target service type and the target time interval.

Optionally, the BSR control information in the first indication frame includes an access category index ACI bitmap field, a traffic identifier difference field, and a trigger interval field.

The ACI bitmap field and the traffic identifier difference field are used to indicate the target service type, and the trigger interval field is used to indicate the target time interval.

Optionally, a value of the ACI bitmap field in the first indication frame is 0, 1, or 2.

When the value of the ACI bitmap field is 0, a value of the traffic identifier difference field is 0, 1, or 2.

When the value of the ACI bitmap field is 1, a value of the traffic identifier difference field is 2 or 3.

When the value of the ACI bitmap field is 2, a value of the traffic identifier difference field is 3.

Optionally, the ACI bitmap field and the traffic identifier difference field in the first indication frame are further used to indicate an access category AC of the data of the first service, and an AC of data transmitted by using the transmission resource is the same as the AC indicated by the first indication frame.

Optionally, the m indication frames are further used to indicate target duration, and duration in which the receive end sends the n trigger frames is greater than or equal to the target duration.

Optionally, the m indication frames include the first indication frame including BSR control information, and the BSR control information in the first indication frame includes an access category index ACI bitmap field, a traffic identifier difference field, a trigger interval field, a data volume indication field, and a duration indication field.

In the BSR control information in the first indication frame, the ACI bitmap field and the traffic identifier difference field are used to indicate the target service type, the trigger interval field is used to indicate the target time interval, the duration indication field is used to indicate the target duration, the data volume indication field is used to indicate the target data volume, the target data volume is the data volume of the data that is of the first service and that is buffered by the transmit end, and the sum of the sizes of the transmission resources indicated by the n trigger frames is positively correlated with the target data volume.

Optionally, in the BSR control information in the first indication frame, the ACI bitmap field, the traffic identifier difference field, the data volume indication field, the trigger interval field, and the duration indication field are sequentially arranged.

Optionally, the trigger interval field and the duration indication field include 10 bits in total.

Optionally, the m indication frames are further used to indicate to start to send the n trigger frames.

Figure 10:
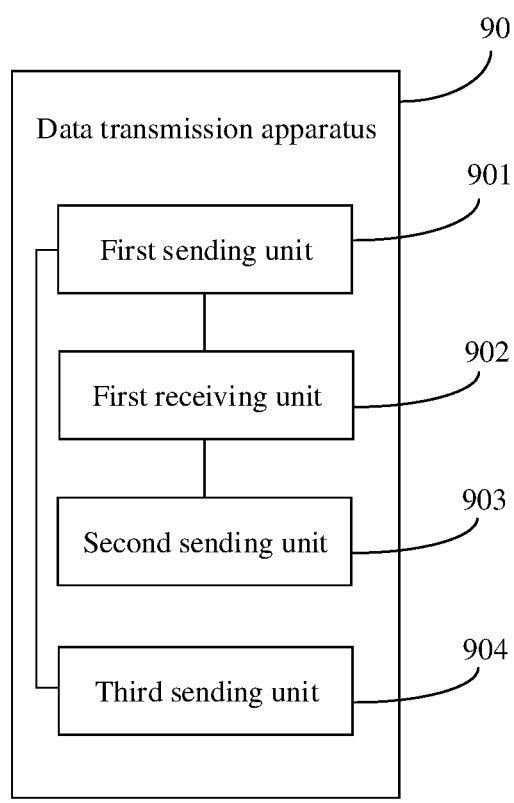
FIG. 10 is a schematic diagram of another structure of a data transmission apparatus according to an embodiment of this application.

Optionally, FIG. 10 is a schematic diagram of another structure of the data transmission apparatus according to an embodiment of this application. As shown in FIG. 10, based on FIG. 9, the data transmission apparatus 90 further includes: a third sending unit 904, configured to: when there is no need to send the data of the first service to the receive end, send an end indication frame to the receive end, where the end indication frame is used to indicate the target service type and indicate to stop sending the n trigger frames.

Optionally, the m indication frames include the first indication frame, and both the first indication frame and the end indication frame include BSR control information.

The BSR control information in the first indication frame is used to indicate the target service type and the target time interval.

The BSR control information in the end indication frame is used to indicate the target service type and indicate to stop sending the trigger frame.

Optionally, the BSR control information in the first indication frame includes the ACI bitmap field, the traffic identifier difference field, the trigger interval field, and a start trigger field. In the BSR control information in the first indication frame, the ACI bitmap field and the traffic identifier difference field are used to indicate the target service type, the trigger interval field is used to indicate the target time interval, and the start trigger field is used to indicate the receive end to start to send the n trigger frames.

The BSR control information in the end indication frame includes the ACI bitmap field, the traffic identifier difference field, and a stop trigger field. In the BSR control information in the end indication frame, the ACI bitmap field and the traffic identifier difference field are used to indicate the target service type, and the stop trigger field is used to indicate to stop sending the n trigger frames.

Optionally, the BSR control information in the first indication frame further includes a data volume indication field used to indicate the target data volume, the target data volume is the data volume of the data that is of the first service and that is buffered by the transmit end, and the sum of the sizes of the transmission resources indicated by the n trigger frames is positively correlated with the target data volume.

In the BSR control information in the first indication frame, the ACI bitmap field, the traffic identifier difference field, the data volume indication field, the trigger interval field, and the start trigger field are sequentially arranged.

Optionally, the trigger interval field and the start trigger field include 10 bits in total, and a quantity of bits of the start trigger field is the same as a quantity of bits of the stop trigger field.

Optionally, the BSR control information in the first indication frame further includes a scaling factor field.

In the BSR control information in the first indication frame, the scaling factor field is located between the traffic identifier difference field and the data volume indication field.

Optionally, the m indication frames include the first indication frame used to indicate the target service type and a second indication frame used to indicate the target time interval.

Optionally, the second indication frame is a beacon frame.

Optionally, the first sending unit 901 is configured to sequentially send the second indication frame and the first indication frame to the receive end.

Optionally, the m indication frames include an indication frame including a quality of service QoS control field, and the QoS control field is used to indicate the target service type.

Optionally, a traffic identifier TID field in the QoS control field is used to indicate the target service type.

Optionally, the TID field includes 4 bits, and a most significant bit in the 4 bits is used to indicate the target service type.

Optionally, the m indication frames are further used to indicate a target start time, and a start time at which the receive end sends the n trigger frames is the target start time.

Optionally, the m indication frames are further used to indicate a target end time, and an end time at which the receive end sends the n trigger frames is the end time.

Optionally, the m indication frames include an add traffic stream ADDTS request frame used to indicate the target service type and the target time interval.

Optionally, a traffic specification TSPEC element in the ADDTS request frame is used to indicate the target service type and the target time interval.

Optionally, the TSPEC element in the ADDTS request frame includes a service type indication field, a trigger interval field, a start time field, an end time field, and a data volume indication field.

The service type indication field is used to indicate the target service type.

The trigger interval field is used to indicate the target time interval.

The start time field is used to indicate the target start time, and the start time at which the receive end sends the n trigger frames is the target start time.

The end time field is used to indicate the target end time, and the end time at which the receive end sends the n trigger frames is the end time.

The data volume indication field is used to indicate the target data volume, the target data volume is the data volume of the data that is of the first service and that is buffered by the transmit end, and the sum of the sizes of the transmission resources indicated by the n trigger frames is positively correlated with the target data volume.

Optionally, in the TSPEC element, the service type indication field, the data volume indication field, the trigger interval field, the start time field, and the end time field are sequentially arranged.

Optionally, the TSPEC element further includes an element identifier field, a length field, and a traffic stream information field.

In the TSPEC element, the element identifier field, the length field, the TS information field, the service type indication field, the data volume indication field, the trigger interval field, the start time field, and the end time field are sequentially arranged.

Figure 11:
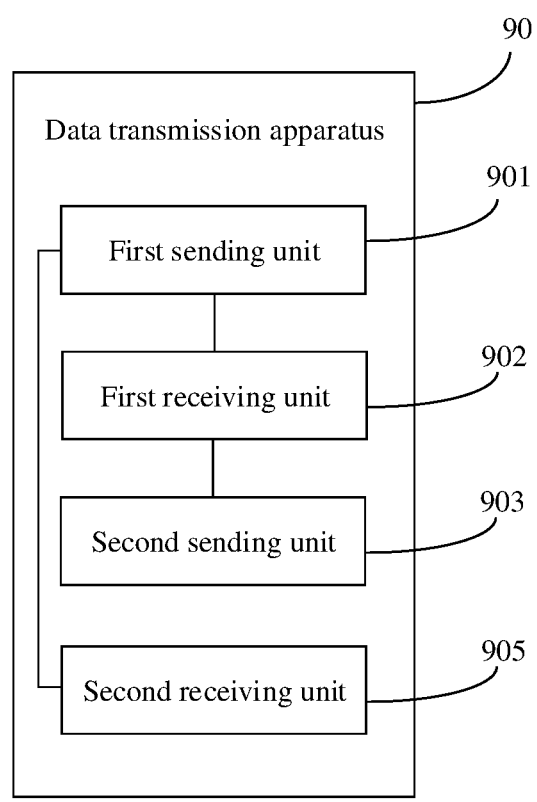
FIG. 11 is a schematic diagram of another structure of a data transmission apparatus according to an embodiment of this application.

Optionally, FIG. 11 is a schematic diagram of another structure of the data transmission apparatus according to an embodiment of this application. As shown in FIG. 11, based on FIG. 9, the data transmission apparatus 90 further includes: a second receiving unit 905, configured to receive an ADDTS response frame that is of the ADDTS request frame and that is sent by the receive end, where the ADDTS response frame is used to indicate the target time interval, the target start time, and the target end time.

Optionally, the TSPEC element includes an element identifier field, a length field, a traffic stream information field, and another field.

The another field is used to indicate the target service type, the target time interval, the target start time, the target end time, and the target data volume.

The start time at which the receive end sends the n trigger frames is the target start time, the end time at which the receive end sends the n trigger frames is the end time, the target data volume is the data volume of the data that is of the first service and that is buffered by the transmit end, and the sum of the sizes of the transmission resources indicated by the n trigger frames is positively correlated with the target data volume.

Optionally, the m indication frames include m target wake time TWT request frames, and the first sending unit 901 is configured to: sequentially send the m TWT request frames to the receive end, where all of the m TWT request frames are used to indicate the target service type, some or all of the TWT request frames are used to indicate a time interval that is requested by the transmit end and at which the receive end sends every two trigger frames, and a time interval indicated by a last TWT request frame in the m TWT request frames is the target time interval.

Figure 12:
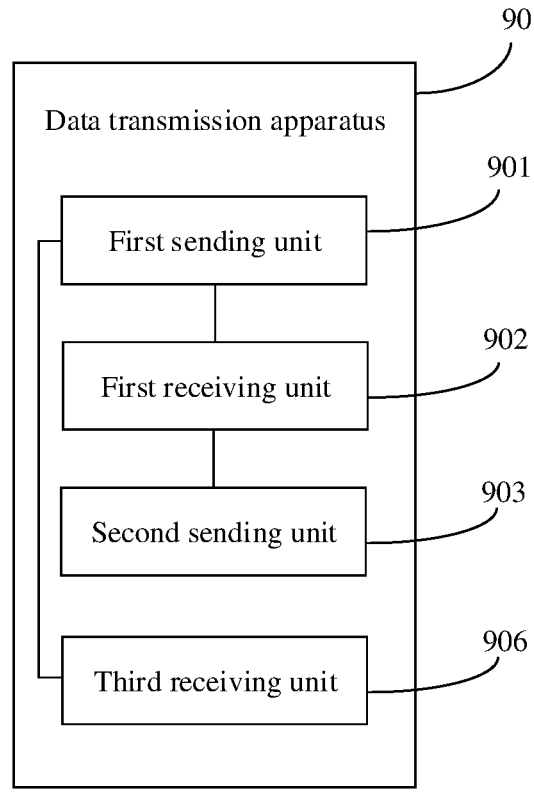
FIG. 12 is a schematic diagram of another structure of a data transmission apparatus according to an embodiment of this application.

FIG. 12 is a schematic diagram of another structure of the data transmission apparatus according to an embodiment of this application. As shown in FIG. 12, based on FIG. 9, the data transmission apparatus 90 further includes: a third receiving unit 906, configured to: each time one TWT request frame is sent to the receive end, receive a TWT response frame that is of the TWT request frame and that is sent by the receive end, where the TWT response frame is used to indicate the target service type and a time interval that is allowed by the receive end and at which the receive end sends every two trigger frames, and a time interval indicated by a TWT response frame of the last TWT request frame is the target time interval.

Optionally, the TWT response frame and the some or all of the TWT request frames each include an individual target wake time TWT parameter set field.

In each of the some or all of the TWT request frames, the individual TWT parameter set field is used to indicate the target service type and the time interval that is requested by the transmit end and at which the receive end sends every two trigger frames.

In the TWT response frame, the individual TWT parameter set field is used to indicate the target service type and the time interval that is allowed by the receive end and at which the receive end sends every two trigger frames.

Optionally, in each of the TWT response frame and the some or all of the TWT request frames, the individual TWT parameter set field includes a request type field used to indicate the target service type.

Optionally, in each of the TWT response frame and the some or all of the TWT request frames, the request type field includes a TWT request field, a TWT setup command field, and a service type indication field, and the service type indication field is used to indicate the target service type.

Alternatively, in each of the some or all of the TWT request frames, the request type field includes a TWT request field and a TWT setup command field. The TWT request field and the TWT setup command field are used to indicate the target service type, a value of the TWT request field is 1, and a value of the TWT setup command field is 3, 4, 5, 6, or 7. In the TWT response frame, the value of the TWT request field is 0, and the value of the TWT setup command field is 0, 1, or 2.

Optionally, in the request type field in each of the TWT response frame and the some or all of the TWT request frames, the TWT request field, the TWT setup command field, and the service type indication field are sequentially arranged.

Optionally, when the request type field in each of the TWT response frame and the some or all of the TWT request frames includes the service type indication field, the request type field in each of the TWT response frame and the some or all of the TWT request frames further includes a TWT protection field, and the TWT protection field is located between the TWT setup command field and the service type indication field.

Optionally, the TWT request field and the TWT setup command field in the TWT request frame are further used to indicate that a TWT type is a request type, a suggest type, or a command type.

The TWT request field and the TWT setup command field in the TWT response frame are further used to indicate that a TWT type is an accept type, a modifiable type, or a command type.

Optionally, the individual TWT parameter set field in each of the TWT request frame and the TWT response frame further includes a TWT wake interval mantissa field and a TWT field.

In the TWT request frame, when the TWT type indicated by the TWT request field and the TWT setup command field is the suggest type or the command type, the TWT wake interval mantissa field is used to indicate the time interval that is requested by the transmit end and at which the receive end sends every two trigger frames, and the TWT field is used to indicate a start time that is requested by the transmit end and at which the receive end sends the n trigger frames. A start time indicated by the last TWT request frame is the target start time.

In the TWT response frame, the TWT wake interval mantissa field is used to indicate the time interval that is allowed by the receive end and at which the receive end sends every two trigger frames, and the TWT field is used to indicate a start time that is allowed by the receive end and at which the receive end sends the n trigger frames; and a start time indicated by the TWT response frame of the last TWT request frame is the target start time.

Optionally, the individual TWT parameter set field in the TWT request frame further includes a TWT group assignment field used to indicate the target data volume.

The target data volume is the data volume of the data that is of the first service and that is buffered by the transmit end, and the sum of the sizes of the transmission resources indicated by the n trigger frames is positively correlated with the target data volume.

In conclusion, in the data transmission apparatus provided in this embodiment of this application, if the type of the first service is the target service type, before sending the data of the first service to the receive end, the first sending unit may send, to the receive end, the m indication frames used to indicate the target service type. After receiving the m indication frames, the receive end may pre-allocate, based on the m indication frames, the transmission resource to the data that is of the service of the target service type and that is to be transmitted by the transmit end, and indicate the transmission resource by sending the trigger frame to the transmit end. In this way, a data transmission delay caused when the transmit end fails to obtain a transmission resource through contention is avoided. This ensures a normal operation of the service.

Figure 13:
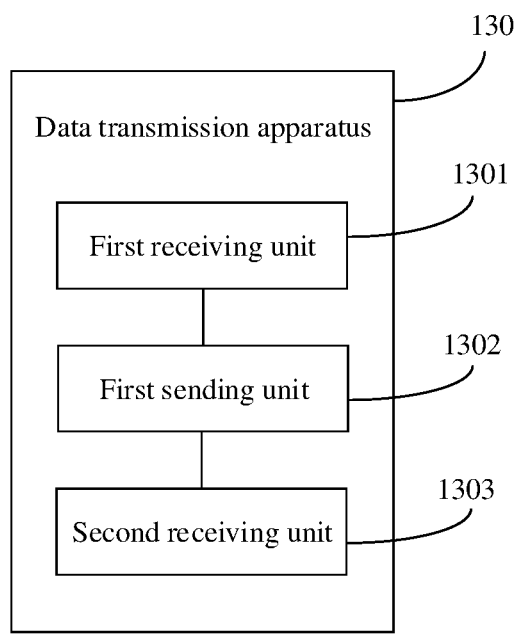
FIG. 13 is a schematic diagram of a structure of another data transmission apparatus according to an embodiment of this application.

FIG. 13 is a schematic diagram of a structure of another data transmission apparatus according to an embodiment of this application. The data transmission apparatus 130 may be used for a receive end. As shown in FIG. 13, the data transmission apparatus 130 may include: a first receiving unit 1301, configured to receive m indication frames sent by a transmit end, where m≥1, and the m indication frames are used to indicate a target service type and a target time interval; a first sending unit 1302, configured to send n trigger frames to the receive end based on the m indication frames, where n≥1, the trigger frame is used to indicate a transmission resource allocated to the transmit end, and the transmission resource is used to transmit data of a service of the target service type; and when n>1, a time interval at which the receive end sends the trigger frame every two adjacent times is less than or equal to the target time interval; and a second receiving unit 1303, configured to: each time one trigger frame is sent, receive, by using a transmission resource indicated by the trigger frame, data that is of a first service of the target service type and that is sent by the transmit end.

In conclusion, in the data transmission apparatus provided in this embodiment of this application, if the type of the first service is the target service type, before sending the data of the first service to the receive end, the transmit end may send, to the receive end, the m indication frames used to indicate the target service type. After the first receiving unit in the receive end receives the m indication frames, the receive end may pre-allocate, based on the m indication frames, the transmission resource to the data that is of the service of the target service type and that is to be transmitted by the transmit end, and indicate the transmission resource by sending the trigger frame to the transmit end. In this way, a data transmission delay caused when the transmit end fails to obtain a transmission resource through contention is avoided. This ensures a normal operation of the service.

Figure 14:
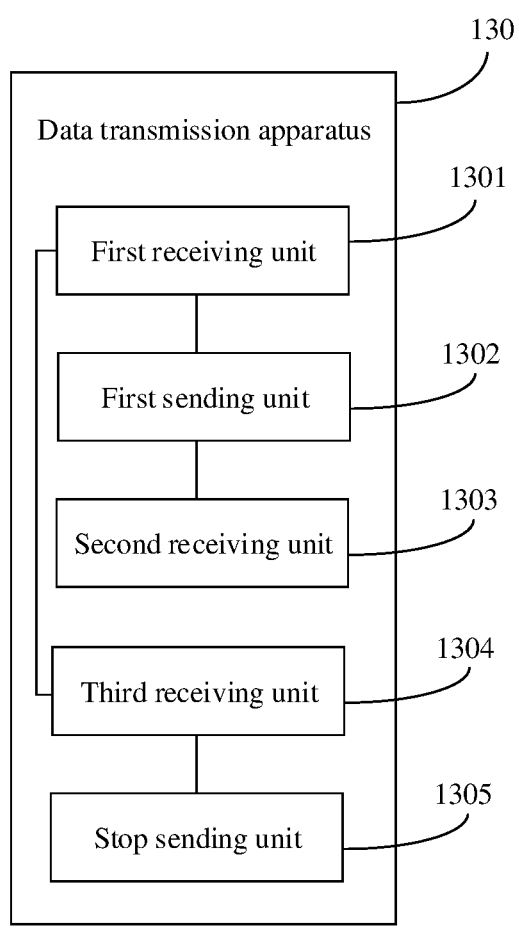
FIG. 14 is a schematic diagram of another structure of a data transmission apparatus according to an embodiment of this application.

Optionally, the m indication frames are further used to indicate to start to send the n trigger frames. FIG. 14 is a schematic diagram of another structure of the data transmission apparatus according to an embodiment of this application. As shown in FIG. 14, based on FIG. 13, the data transmission apparatus 130 further includes: a third receiving unit 1304, configured to receive an end indication frame sent by the transmit end, where the end indication frame is used to indicate the target service type and indicate to stop sending the trigger frame; and a stop sending unit 1305, configured to stop, based on the end indication frame, sending the n trigger frames to the transmit end.

Optionally, the m indication frames include a first indication frame used to indicate the target service type and a second indication frame used to indicate the target time interval, and the first receiving unit 1301 is configured to sequentially receive the second indication frame and the first indication frame that are sent by the transmit end.

Figure 15:
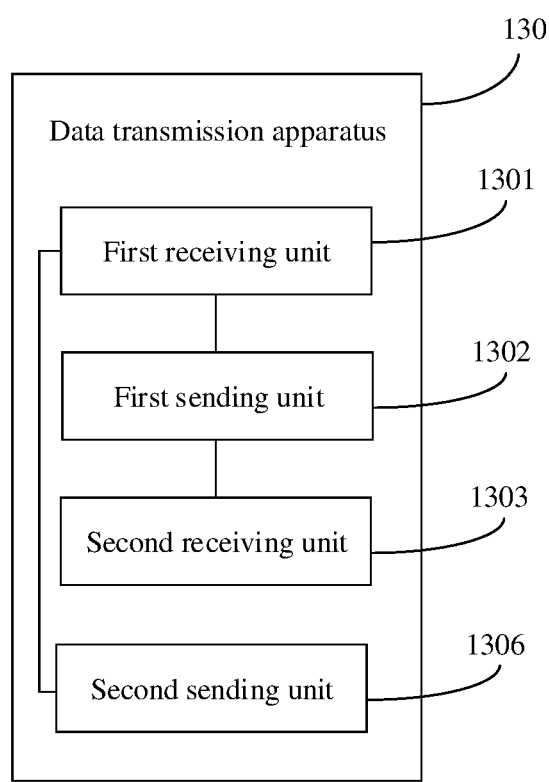
FIG. 15 is a schematic diagram of another structure of a data transmission apparatus according to an embodiment of this application.

Optionally, the m indication frames include an ADDTS request frame, and a TSPEC element in the ADDTS request frame includes a service type indication field, a trigger interval field, a start time field, and an end time field. The service type indication field is used to indicate the target service type. The trigger interval field is used to indicate the target time interval. The start time field is used to indicate a target start time, and the start time at which the receive end sends the n trigger frames is the target start time. The end time field is used to indicate a target end time, and the end time at which the receive end sends the n trigger frames is the end time. FIG. 15 is a schematic diagram of another structure of the data transmission apparatus according to an embodiment of this application. As shown in FIG. 15, based on FIG. 13, the data transmission apparatus 130 further includes: a second sending unit 1306, configured to send an ADDTS response frame of the ADDTS request frame to the transmit end, where the ADDTS response frame is used to indicate the target time interval, the target start time, and the target end time.

Optionally, the m indication frames include m target wake time TWT request frames, and the first receiving unit is configured to: sequentially receive the m TWT request frames sent by the transmit end, where all of the m TWT request frames are used to indicate the target service type, some or all of the TWT request frames are used to indicate a time interval that is requested by the transmit end and at which the receive end sends every two trigger frames, and a time interval indicated by a last TWT request frame in the m TWT request frames is the target time interval.

Figure 16:
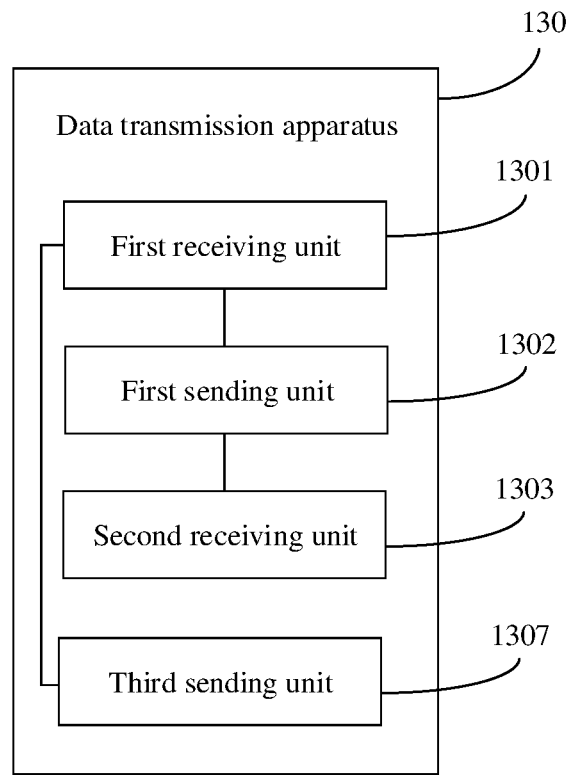
FIG. 16 is a schematic diagram of another structure of a data transmission apparatus according to an embodiment of this application.

FIG. 16 is a schematic diagram of another structure of the data transmission apparatus according to an embodiment of this application. As shown in FIG. 16, based on FIG. 13, the data transmission apparatus 130 further includes: a third sending unit 1307, configured to: each time one TWT request frame sent by the transmit end is received, send a TWT response frame of the TWT request frame to the transmit end, where the TWT response frame is used to indicate the target service type and a time interval that is allowed by the receive end and at which the receive end sends every two trigger frames, and a time interval indicated by a TWT response frame of the last TWT request frame is the target time interval.

In conclusion, in the data transmission apparatus provided in this embodiment of this application, if the type of the first service is the target service type, before sending the data of the first service to the receive end, the transmit end may send, to the receive end, the m indication frames used to indicate the target service type. After the first receiving unit in the receive end receives the m indication frames, the receive end may pre-allocate, based on the m indication frames, the transmission resource to the data that is of the service of the target service type and that is to be transmitted by the transmit end, and indicate the transmission resource by sending the trigger frame to the transmit end. In this way, a data transmission delay caused when the transmit end fails to obtain a transmission resource through contention is avoided. This ensures a normal operation of the service.

Figure 17:
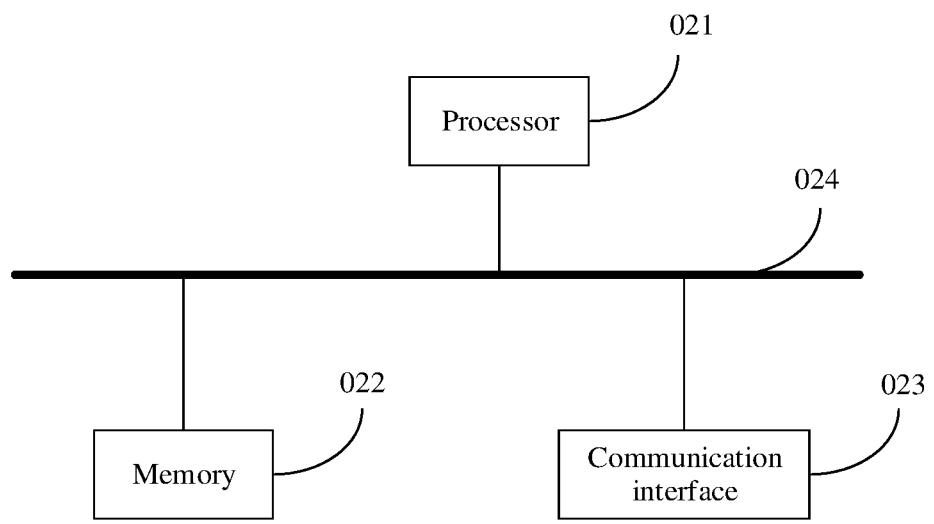
FIG. 17 is a schematic diagram of a structure of another data transmission apparatus according to an embodiment of this application.

FIG. 17 is a schematic diagram of a structure of another data transmission apparatus according to an embodiment of this application. The data transmission apparatus may be used for a transmit end. Refer to FIG. 17. The data transmission apparatus may include a processor 021, a memory 022, a communication interface 023, and a bus 024. The processor 021, the memory 022, the communication interface 023 are communicatively connected to each other through the bus 024. There are a plurality of communication interfaces 023, and the communication interface 023 is configured to communicate with another device under control of the processor 021. The memory 022 is configured to store computer instructions. The processor 021 can invoke, through the bus 024, the computer instructions stored in the memory 022, to implement steps performed by the transmit end in the data transmission method provided in the embodiments of this application.

Figure 18:
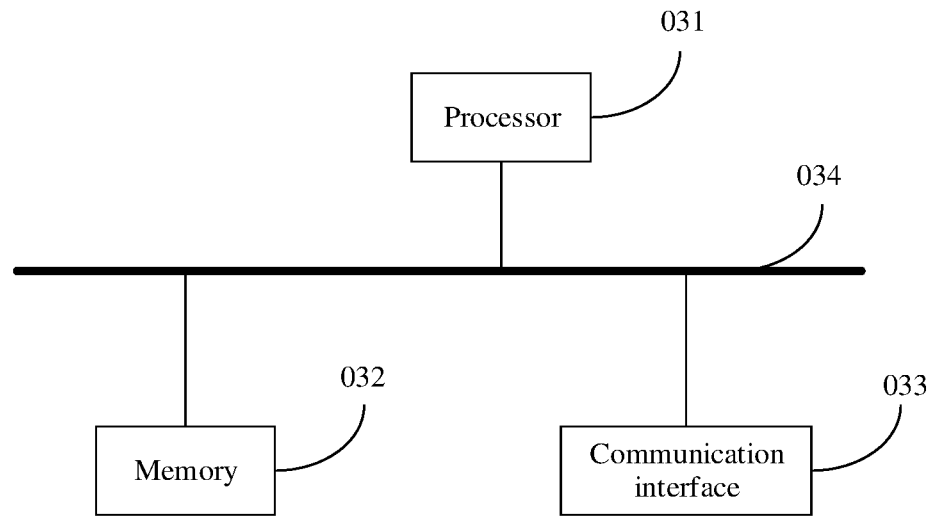
FIG. 18 is a schematic diagram of a structure of another data transmission apparatus according to an embodiment of this application.

FIG. 18 is a schematic diagram of a structure of another data transmission apparatus according to an embodiment of this application. The data transmission apparatus may be used for a receive end. Refer to FIG. 18. The data transmission apparatus may include a processor 031, a memory 032, a communication interface 033, and a bus 034. The processor 031, the memory 032, the communication interface 033 are communicatively connected to each other through the bus 034. There are a plurality of communication interfaces 033, and the communication interface 033 is configured to communicate with another device under control of the processor 031. The memory 032 is configured to store computer instructions. The processor 031 can invoke, through the bus 034, the computer instructions stored in the memory 032, to implement steps performed by the receive end in the data transmission method provided in the embodiments of this application.

Figure 19:
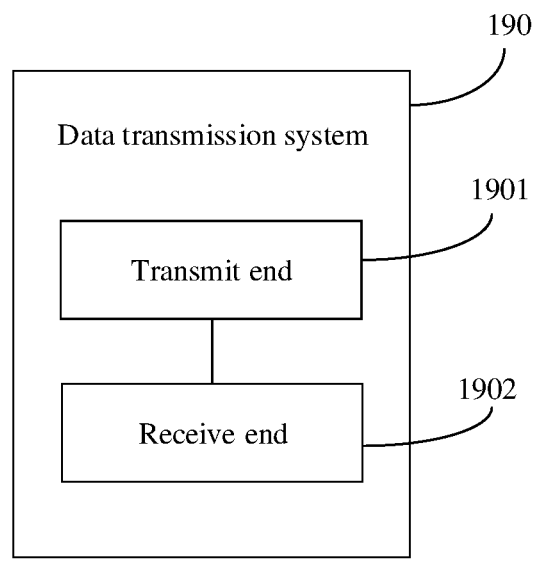
FIG. 19 is a schematic diagram of a structure of a data transmission system according to an embodiment of this application.

FIG. 19 is a schematic diagram of a structure of a data transmission system according to an embodiment of this application. As shown in FIG. 19, the data transmission system 190 includes a transmit end 1901 and at least one receive end 1902 (FIG. 19 shows only one receive end 1902).

The transmit end includes the data transmission apparatus shown in any one of FIG. 9 to FIG. 12, and the receive end includes the data transmission apparatus shown in any one of FIG. 13 to FIG. 16. Alternatively, the transmit end includes the data transmission apparatus shown in FIG. 17, and the receive end includes the data transmission apparatus shown in FIG. 18.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of this application are completely or partially generated. The computer may be a general-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid-state drive), or the like.

In this disclosure, the terms "first", "second", "third", and "fourth" are merely used for a purpose of description, and shall not be understood as an indication or implication of relative importance. The term "a plurality of" means two or more, unless otherwise expressly limited.

The term "and/or" in this application describes only an association relationship for describing associated objects and indicates that three relationships may exist. For example, A and/or B may indicate the following three cases: Only A exists, both A and B exist, and only B exists. In addition, the character "/" in this specification usually indicates an "or" relationship between the associated objects.

It should be noted that mutual reference may be made to the method embodiments provided in the embodiments of this application and the corresponding apparatus embodiments. This is not limited in the embodiments of this application. A sequence of the steps of the method embodiments provided in the embodiments of this application can be properly adjusted, and the steps can be correspondingly added or deleted based on a situation. Any method that can be easily figured out by a person skilled in the art without departing from a technical scope disclosed in this application shall fall within the protection scope of this application, and therefore details are not described again.

The foregoing descriptions are merely optional embodiments of this application, but are not intended to limit this application. Any modification, equivalent replacement, improvement, or the like made without departing from the spirit and principle of this application shall fall within the protection scope of this application.

What is claimed is:

1. A method, comprising:
   when data of a first service is to be sent to a first apparatus, sending, by a second apparatus, m indication frames to the first apparatus when a type of the first service is a target service type, wherein m≥1, and the m indication frames indicate the target service type and a target time interval;
   receiving, by the second apparatus, n trigger frames sent by the first apparatus based on the m indication frames, wherein n≥1, each of the n trigger frames indicates a transmission resource allocated to the second apparatus, and each transmission resource is for transmitting data of a service of the target service type, and wherein when n>1, a time interval at which the first apparatus sends a trigger frame every two adjacent times is less than or equal to the target time interval; and
   each time a trigger frame of the n trigger frames is received, sending, by the second apparatus, the data of the first service to the first apparatus using a transmission resource indicated by the respective trigger frame.

2. The method according to claim 1, wherein the m indication frames further indicate a target data volume, the target data volume is a data volume of the data of the first service that is buffered by the second apparatus, and a sum of sizes of transmission resources indicated by the n trigger frames is positively correlated with the target data volume.

3. The method according to claim 1, wherein the m indication frames further indicate an identifier of the first service.

4. The method according to claim 1, wherein the m indication frames comprise a first indication frame comprising buffer status report (BSR) control information, and the BSR control information in the first indication frame indicates the target service type and the target time interval.

5. The method according to claim 4, wherein the BSR control information in the first indication frame comprises an access category index (ACI) bitmap field, a traffic identifier difference field, and a trigger interval field; and
   wherein the ACI bitmap field and the traffic identifier difference field indicate the target service type, and the trigger interval field indicates the target time interval.

6. The method according to claim 5, wherein a value of the ACI bitmap field in the first indication frame is 0, 1, or 2; and
   wherein:
      when the value of the ACI bitmap field is 0, a value of the traffic identifier difference field is 0, 1, or 2;
      when the value of the ACI bitmap field is 1, a value of the traffic identifier difference field is 2 or 3; or
      when the value of the ACI bitmap field is 2, a value of the traffic identifier difference field is 3.

7. The method according to claim 5, wherein the ACI bitmap field and the traffic identifier difference field in the first indication frame further indicate an access category (AC) of the data of the first service, and an AC of data transmitted using the transmission resource is the same as the AC indicated by the first indication frame.

8. The method according to claim 1, wherein the m indication frames further indicate target duration, and a duration in which the first apparatus sends the n trigger frames is greater than or equal to the target duration.

9. The method according to claim 8, wherein:
   the m indication frames comprise a first indication frame comprising buffer status report (BSR) control information, and the BSR control information in the first indication frame comprises an access category index (ACI) bitmap field, a traffic identifier difference field, a trigger interval field, a data volume indication field, and a duration indication field; and
   wherein in the BSR control information in the first indication frame, the ACI bitmap field and the traffic identifier difference field indicate the target service type, the trigger interval field indicates the target time interval, the duration indication field indicates the target duration, the data volume indication field indicates a target data volume, the target data volume is a data volume of the data that is of the first service and that is buffered by the second apparatus, and a sum of sizes of the transmission resources indicated by the n trigger frames is positively correlated with the target data volume.

10. The method according to claim 1, wherein the m indication frames further indicate to start to send the n trigger frames.

11. The method according to claim 10, wherein after sending the m indication frames to the first apparatus, the method further comprises:
when there is no need to send further data of the first service to the first apparatus, sending an end indication frame to the first apparatus, wherein the end indication frame indicates the target service type and indicates to stop sending the n trigger frames.

12. The method according to claim 11, wherein:
the m indication frames comprise a first indication frame, and both the first indication frame and the end indication frame comprise buffer status report (BSR) control information;
the BSR control information in the first indication frame indicates the target service type and the target time interval; and
the BSR control information in the end indication frame indicates the target service type and indicates to stop sending the trigger frame.

13. The method according to claim 12, wherein:
the BSR control information in the first indication frame comprises an access category index (ACI) bitmap field, a traffic identifier difference field, a trigger interval field, and a start trigger field, and in the BSR control information in the first indication frame, the ACI bitmap field and the traffic identifier difference field indicate the target service type, the trigger interval field indicates the target time interval, and the start trigger field indicates to the first apparatus to start to send the n trigger frames; and
the BSR control information in the end indication frame comprises the ACI bitmap field, the traffic identifier difference field, and a stop trigger field, and in the BSR control information in the end indication frame, the ACI bitmap field and the traffic identifier difference field indicate the target service type, and the stop trigger field indicates to stop sending the n trigger frames.

14. The method according to claim 13, wherein:
the BSR control information in the first indication frame further comprises a data volume indication field indicating a target data volume, the target data volume is a volume of the data that is of the first service and that is buffered by the second apparatus, and a sum of sizes of the transmission resources indicated by the n trigger frames is positively correlated with the target data volume; and
in the BSR control information in the first indication frame, the ACI bitmap field, the traffic identifier difference field, the data volume indication field, the trigger interval field, and the start trigger field are sequentially arranged.

15. The method according to claim 1, wherein the m indication frames further indicate a target start time, and a start time at which the first apparatus sends the n trigger frames is the target start time.

16. The method according to claim 15, wherein the m indication frames further indicate a target end time, and an end time at which the first apparatus sends the n trigger frames is the end time.

17. The method according to claim 1, wherein the m indication frames comprise an add traffic stream (ADDTS) request frame indicating the target service type and the target time interval.

18. The method according to claim 17, wherein:
a traffic specification (TSPEC) element in the ADDTS request frame indicates the target service type and the target time interval;
the TSPEC element in the ADDTS request frame comprises a service type indication field, a trigger interval field, a start time field, an end time field, and a data volume indication field;
the service type indication field indicates the target service type;
the trigger interval field indicates the target time interval;
the start time field indicates a target start time, and a start time at which the first apparatus sends the n trigger frames is the target start time;
the end time field indicates a target end time, and an end time at which the first apparatus sends the n trigger frames is the end time; and
the data volume indication field indicates a target data volume, the target data volume is a data volume of the data that is of the first service and that is buffered by the second apparatus, and a sum of sizes of the transmission resources indicated by the n trigger frames is positively correlated with the target data volume.

19. A method, comprising:
receiving, by a first apparatus, m indication frames sent by a second apparatus, wherein m≥1, and the m indication frames indicate a target service type and a target time interval;
sending, by the first apparatus, n trigger frames to the second apparatus based on the m indication frames, wherein n≥1, each of the n trigger frames indicates a transmission resource allocated to the second apparatus, and each transmission resource is for transmitting data of a service of the target service type, and when n>1, a time interval at which the first apparatus sends a trigger frame every two adjacent times is less than or equal to the target time interval; and
each time a trigger frame is sent, receiving, by the first apparatus using a transmission resource indicated by the respective trigger frame, data that is of a first service of the target service type and that is sent by the second apparatus.

20. An apparatus, comprising:
at least one processor; and
a non-transitory computer readable storage medium storing a program that is executable by the at least one processor, the program comprising instructions for:
when data of a first service is to be sent to a first apparatus, sending m indication frames to the first apparatus when a type of the first service is a target service type, wherein m≥1, and the m indication frames indicate the target service type and a target time interval;
receiving n trigger frames sent by the first apparatus based on the m indication frames, wherein n≥1, each of the n trigger frames indicate a transmission resource allocated to the apparatus, and each transmission resource is for transmitting data of a service of the target service type, and wherein when n>1, a time interval at which the first apparatus sends a trigger frame every two adjacent times is less than or equal to the target time interval; and
each time a trigger frame of the n trigger frames is received, sending the data of the first service to the first apparatus using a transmission resource indicated by the respective trigger frame.

\* \* \* \* \*